United States Patent
Jung et al.

(10) Patent No.: US 11,265,044 B2
(45) Date of Patent: Mar. 1, 2022

(54) METHOD AND APPARATUS FOR TRANSMITTING OR RECEIVING MULTIPLE PIECES OF DATA IN WIRELESS COOPERATIVE COMMUNICATION SYSTEM

(71) Applicant: SAMSUNG ELECTRONICS CO., LTD., Suwon-si (KR)

(72) Inventors: Euichang Jung, Suwon-si (KR); Hoondong Noh, Suwon-si (KR); Jinhyun Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/999,397

(22) Filed: Aug. 21, 2020

(65) Prior Publication Data
US 2021/0058113 A1 Feb. 25, 2021

(30) Foreign Application Priority Data

Aug. 23, 2019 (KR) .................. 10-2019-0104052
Oct. 2, 2019 (KR) .................. 10-2019-0122630

(51) Int. Cl.
*H04B 7/02* (2018.01)
*H04B 7/024* (2017.01)
(Continued)

(52) U.S. Cl.
CPC .......... *H04B 7/024* (2013.01); *H04B 7/0628* (2013.01); *H04B 7/086* (2013.01); *H04L 5/0023* (2013.01); *H04L 5/0035* (2013.01)

(58) Field of Classification Search
CPC ..... H04L 5/0035; H04L 5/001; H04L 5/0051; H04L 5/0094; H04L 5/0044; H04L 27/26; H04L 5/0025; H04L 5/10; H04L 1/0038
(Continued)

(56) References Cited

U.S. PATENT DOCUMENTS 8,848,623 B2 9/2014 Zhijun et al.
9,312,995 B2 4/2016 Baligh et al.
(Continued)

OTHER PUBLICATIONS

ZTE, "Enhancements on Multi-TRP and Multi-panel Transmission", R1-1908191, 3GPP TSG RAN WG1 #98, Prague, CZ, Aug. 26-30, 2019, 21 pages.
(Continued)

*Primary Examiner* — Zewdu A Kassa
(74) *Attorney, Agent, or Firm* — Nixon & Vanderhye P.C.

(57) ABSTRACT

The disclosure relates to a communication technique for convergence of IoT technology and a pre-$5^{th}$ generation (5G) or 5G communication system for supporting higher data transmission rates beyond a $4^{th}$ generation (4G) system such as long term evolution (LTE), and a system therefor. The disclosure is applicable to intelligent services (for example, smart homes, smart buildings, smart cities, smart cars or connected cars, healthcare, digital education, retail businesses, security and safety related services, etc.) based on 5G communication technology an IoT-related technology. According to various embodiments, a method and apparatus for transmitting or receiving multiple pieces of data in a wireless cooperative communication system may be provided.

15 Claims, 17 Drawing Sheets

(51) Int. Cl.
  *H04L 5/00* (2006.01)
  *H04B 7/06* (2006.01)
  *H04B 7/08* (2006.01)

(58) Field of Classification Search
  USPC .............................. 375/267, 219, 295, 316
  See application file for complete search history.

(56) References Cited

U.S. PATENT DOCUMENTS

| | | | | |
|---|---|---|---|---|
| 2011/0261769 | A1* | 10/2011 | Ji | H04W 72/0453 |
| | | | | 370/329 |
| 2018/0132215 | A1* | 5/2018 | Zhang | H04L 5/0035 |
| 2019/0306848 | A1* | 10/2019 | Zhou | H04W 72/08 |

OTHER PUBLICATIONS

PCT International Search Report dated Nov. 25, 2020 for PCT/KR2020/011199, 3 pgs.

Huawei, et al., 'Clarification of QCL assumption for PDSCH reception', R1-1909439, 3GPP TSG RAN WG1 Meeting #98, Prague, Czech Republic, Aug. 17, 2019 sections 2.1, 2.2.

5G; NR; Physical layer procedures for data (3GPP TS 38.214 version 15.6.0 Release 15), ETSI 138 214 V15.6.0 (Jul. 2019), Jun. 24, 2019 section 5.1.5.

Nokia et al., 'Default QCL assumption for periodic CSI-RS', R1-1909416, 3GPP TSG RAN WG1 Meeting #98, Prague, Czech Republic, Aug. 16, 2019 section 5.1.5.

Huawei et al., 'Correction on UE capability parameter for configured TCI states in 38.214', R1-1909449, 3GPP TSG RAN WG1 Meeting #98, Prague, Czech Republic, Aug. 17, 2019 section 5.1.5.

* cited by examiner

FIG. 9
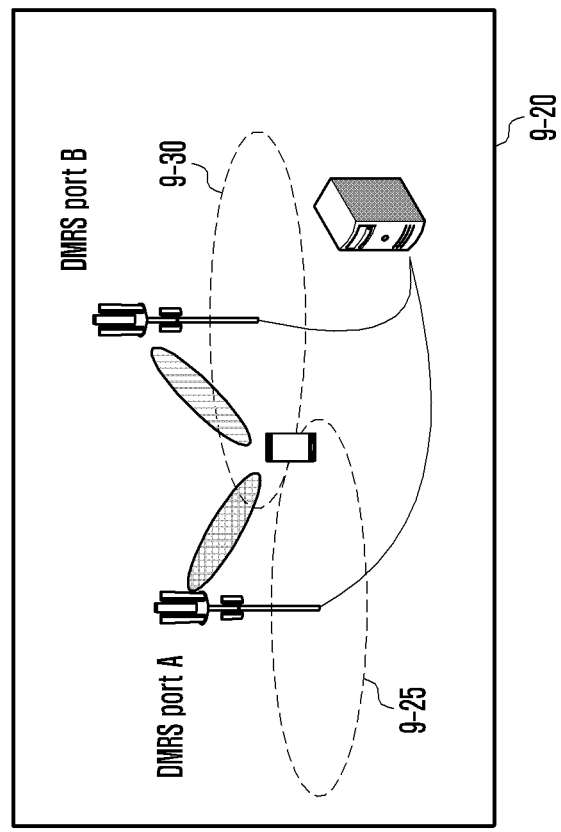
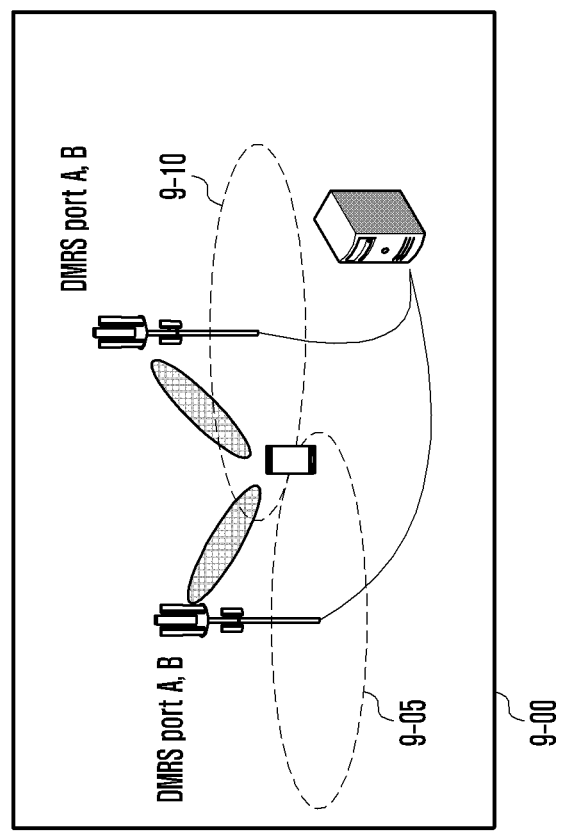

METHOD AND APPARATUS FOR TRANSMITTING OR RECEIVING MULTIPLE PIECES OF DATA IN WIRELESS COOPERATIVE COMMUNICATION SYSTEM

CROSS-REFERENCE TO RELATED APPLICATIONS

This application is based on and claims priority under 35 U.S.C. § 119 to Korean Patent Application No. 10-2019-0104052, filed on Aug. 23, 2019, and Korean Patent Application No. 10-2019-0122630, filed on Oct. 2, 2019, in the Korean Intellectual Property Office, the disclosures of which are incorporated by reference herein in their entireties.

BACKGROUND

Field

The disclosure relates to a wireless communication system, and a method and apparatus for transmitting or receiving multiple pieces of data in a wireless cooperative communication system.

Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a connectivity network where humans generate and consume information, is now evolving to the Internet of things (IoT) where distributed entities, such as things, exchange and process information without human intervention. The Internet of everything (IoE), which may refer, for example, to a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, there is a need to provide data transmission/reception schemes for cooperative communication.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and apparatus for transmitting and/or receiving one or more pieces of data between a transmission node and a terminal, in order to perform cooperative communication in a wireless communication system.

The disclosure is not limited to the above mentioned aspects, and other technical aspects may be clearly understood, through the following descriptions, by those skilled in the art to which the disclosure pertains.

Embodiments of the disclosure provide a method of operating a base station in a wireless communication system, a method for transmitting a single transport block (TB) or multiple TBs and a method for transmitting DCI information based on a beam change of a base station, to support joint transmission.

In order to address the above problems, a method for processing a control signal in a wireless communication system according to an example embodiment of the disclosure includes: receiving a first control signal transmitted from a base station; processing the received first control signal; and transmitting, to the base station, a second control signal generated based on the processing.

In order to address the above problems, a method of operating a terminal according to an example embodiment of the disclosure includes: receiving configuration information from a base station; receiving at least one of first control information or second control information from the base station based on the configuration information; determining a data reception operation method through a first data channel or a second data channel based on at least one of a first time offset between the first data channel and a first control channel corresponding to the first control information or a second time offset between the second data channel and a second control channel corresponding to the second control information; and receiving data through the first data channel or the second data channel based on a result of the determination.

In order to address the above problems, a terminal according to an example embodiment of the disclosure includes: a transceiver and a controller configured to control the terminal to: receive configuration information from a base station; receive at least one of first control information or second control information from the base station based on the configuration information; determine a data reception operation method through a first data channel or a second data channel based on at least one of a first time offset between the first data channel and a first control channel corresponding to the first control information or a second time offset between the second data channel and a second control channel corresponding to the second control information; and receive data through the first data channel or the second data channel based on a result of the determination.

According to an example embodiment, in order to perform cooperative communication in a wireless communication system, a method and apparatus for transmitting or receiving one or more data between a transmission node and a terminal may be provided.

Effects obtainable from the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9 is a diagram illustrating an example of a cooperative communication antenna port configuration according to an embodiment;

DETAILED DESCRIPTION

Figure 1:
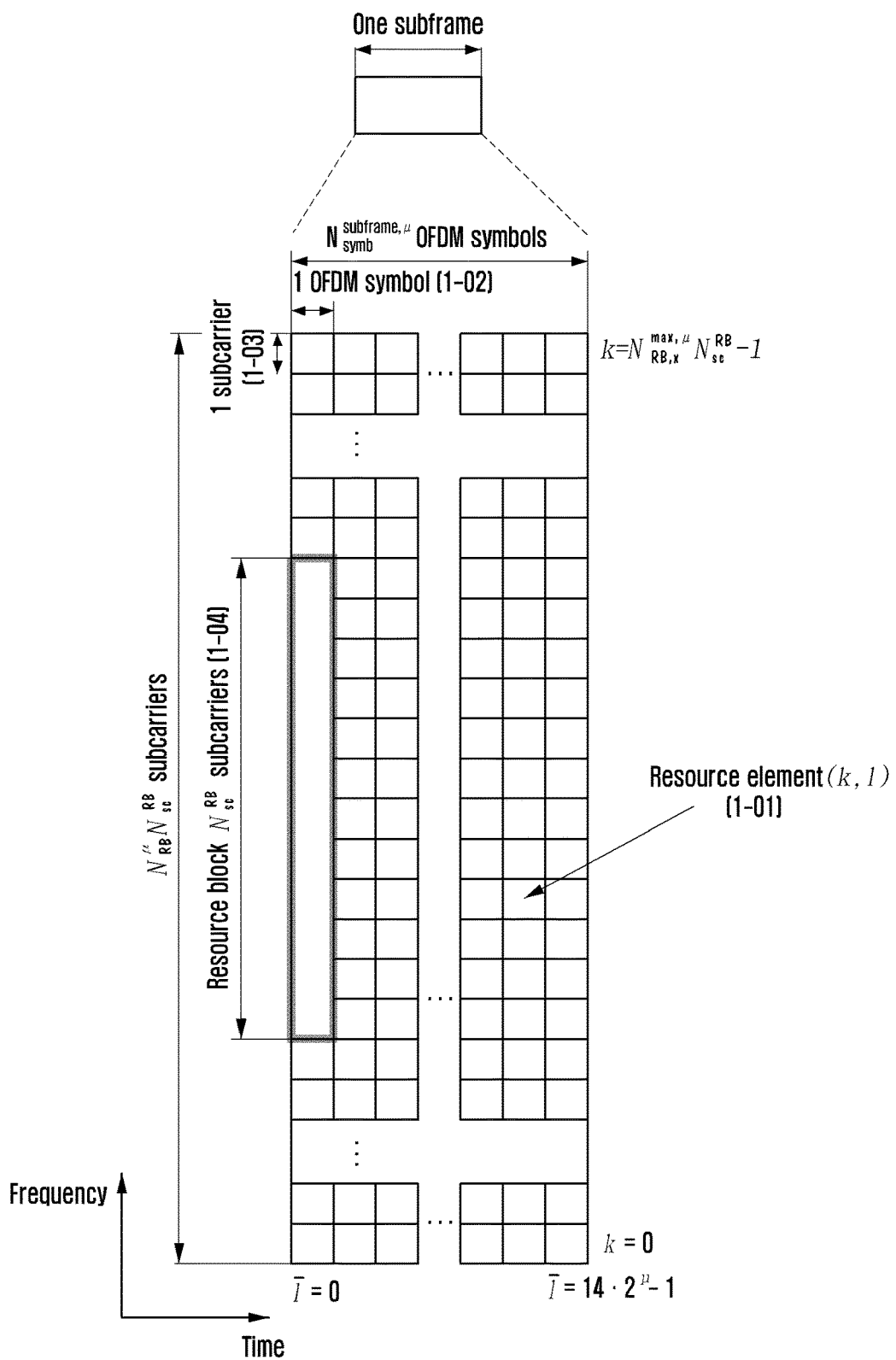
FIG. 1 is a diagram illustrating an example time-frequency domain transmission structure of a long term evolution (LTE or evolved universal terrestrial radio access (E-UTRA)) system, an LTE-A system, an NR system, or a wireless communication system similar thereto according to an embodiment.

Hereinafter, various example embodiments of the disclosure will be described in greater detail with reference to the accompanying drawings.

In describing the various example embodiments of the disclosure, descriptions related to technical contents well-known in the art and not associated directly with the disclosure may be omitted for clarity. Such an omission is intended to avoid obscuring of the disclosure with unnecessary detail and to more clearly describe the example embodiments.

In the accompanying drawings, some elements may be exaggerated, omitted, or schematically illustrated. Further, the size of each element does not completely reflect the actual size. In the drawings, identical or corresponding elements are provided with identical reference numerals.

The features of the disclosure and the manner in which to achieve them will be apparent by making reference to embodiments as described below in conjunction with the accompanying drawings. However, the disclosure is not limited to the embodiments set forth below, but may be implemented in various different forms. The following example embodiments are provided for illustrative purposes and are not intended to limit the disclosure. Throughout the disclosure, the same or like reference numerals may designate the same or like elements.

It will be understood that each block of the flowchart illustrations, and combinations of blocks in the flowchart illustrations, may be implemented by computer program instructions. The computer program instructions may be provided to a processor of a general purpose computer, special purpose computer, or other programmable data processing apparatus to produce a machine, such that the instructions, when executed via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). The codes may include a code made by a compiler and/or a code executable by an interpreter. It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as, for example, and without limitation, a Field Programmable Gate Array (FPGA) or an Application Specific Integrated Circuit (ASIC), which performs a predetermined function, or any combination of software and hardware. However, the "unit" does not always have a meaning limited to software or hardware. The "unit" may be constructed either to be stored in an addressable storage medium or to execute one or more processors. Therefore, the "unit" includes, for example, and without limitation, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in greater detail with reference to the accompanying drawings. In the following description of the disclosure, a detailed description of known functions or configurations incorporated herein may be omitted when it may make the subject matter of the disclosure unclear. The terms which will be described below are terms defined in consideration of the functions in the disclosure, and may be different according to users, intentions of the users, or customs. Therefore, the definitions of the terms should be made based on the contents throughout the disclosure. Hereinafter, a base station may refer, for example, to an entity that performs resource allocation to a terminal, and may include, for example, and without limitation, at least one of a gNode B (gNB), an eNode B (eNB), a Node B, a base station (BS), a radio access unit, a base station controller, a node on a network, or the like. A terminal may include, for example, and without limitation, a user equipment (UE), a mobile station (MS), a terminal, a cellular phone, a smartphone, a computer, a multimedia system capable of performing a communication function, or the like, but is not limited thereto.

Hereinafter, the disclosure describes a technology for receiving broadcasting information from a base station by a terminal in a wireless communication system. The disclosure relates generally to a communication technique for convergence of an Internet of Things (IoT) technology and a $5^{th}$ generation (5G) communication system for supporting higher data transmission rates beyond a $4^{th}$ generation (4G) system such as long term evolution (LTE), and a system therefor. The disclosure is also applicable to intelligent services (for example, smart homes, smart buildings, smart cities, smart cars or connected cars, healthcare, digital education, retail businesses, or security and safety related services, etc.) based on a 5G communication technology and an IoT-related technology.

In the following description, terms referring to broadcast information, terms referring to control information, terms associated with communication coverage, terms referring to state changes (e.g., event), terms referring to network entities, terms referring to messages, terms referring to device elements, and the like are illustratively used for the sake of convenience and ease of description. The disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

Wireless communication systems have expanded beyond the original role of providing voice-oriented service and have evolved into wideband wireless communication systems that provide a high-speed and high-quality packet data service according to, for example, communication standards such as high-speed packet access (HSPA), long term evolution (LTE or evolved universal terrestrial radio access (E-UTRA)), LTE-Advanced (LTE-A), and LTE-Pro of 3GPP, high-rate packet data (HRPD) and a ultra-mobile broadband (UMB) of 3GPP2, and 802.16e of IEEE. Furthermore, communication standards of 5G or new radio (NR) are being developed as 5th generation wireless communication systems.

As a representative example of a broadband wireless communication system, an LTE system adopts an orthogonal frequency-division multiplexing (OFDM) scheme in a downlink (DL), and adopts a single carrier frequency-division multiple access (SC-FDMA) in an uplink (UL). The uplink indicates a wireless link through which data or a control signal is transmitted from a terminal (a user equipment (UE) or a mobile station (MS)) to a base station (an eNode B or a base station (BS)), and the downlink indicates a wireless link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

As a next generation communication system beyond LTE, e.g., a 5G communication system needs to support services satisfying various requirements in order to freely accommodate various requirements of users and service providers. The services considered for the 5G system may be enhanced mobile broadband (eMBB), massive machine type communications (mMTC), ultra-reliable and low-latency communication (URLLC), and the like.

According to various example embodiments, the eMBB aims to provide a more enhanced data rate compared to a data rate supported by the conventional LTE, LTE-A, or LTE-Pro. For example, in the 5G communication system, the eMBB needs to provide a peak data rate of 20 Gbps for a DL, and a peak data rate of 10 Gbps for an uplink, in view of a single base station. Further, the 5G communication system needs to provide an increased user perceived data rate of a terminal. In order to meet these requirements, the improvement of various transmission/reception technologies including a more enhanced multi-input multi-output (MIMO) transmission technology is required. In addition, a data rate required in the 5G communication system is satisfied using a frequency bandwidth wider than 20 MHz in the frequency band of 3-6 GHz or 6 GHz or more, instead of the frequency band of 2 GHz used in the current LTE system.

In addition, in order to support application services such as Internet of Things (IoT) in the 5G communication system, mMTC is being considered. The mMTC may require large terminal access support in a cell, terminal coverage improvement, enhanced battery time, and reduced terminal cost, in order to efficiently provide the IoT. In the IoT, since a terminal may be attached to various sensors and devices to provide a communication function, the IoT needs to support a large number of terminals (for example, 1,000,000 terminals/km2) in a cell. Further, since, in consideration of the characteristic of the service, the terminal supporting the mMTC is likely to be located in a shaded area where a cell may not cover, such as the basement of a building, broader coverage may be required than other services provided by the 5G system. A low-cost terminal may be required for the terminal supporting the mMTC, and a very long battery lifetime may be required in the mMTC, since it is difficult to frequently replace the battery of the terminal.

The URLLC may refer, for example, to a cellular-based wireless communication service used for a mission-critical purpose, is a service used for remote control for a robot or machinery, industrial automation, unmanned aerial vehicles, remote health care, emergency alerts, and the like, and needs to provide ultra-low latency and ultra-high reliability communication. For example, services supporting the URLLC may need to meet an air interface latency of less than 0.5 milliseconds, and also have a requirement of a packet error rate of $10^{-5}$ or less. Accordingly, for services supporting the URLLC, the 5G system needs to provide a transmit time interval (TTI) smaller than that of the other services, and a design requirement for assigning a wider resource in the frequency band is required as well. However, the above-described mMTC, URLLC, and eMBB are merely examples of different types of services, and types of services which are to be applied according to the disclosure are not limited to the above-described examples.

The services considered in the above-described 5G communication system need to be multiplexed and provided on a single framework basis. For example, for efficient resource management and control, the services may be controlled and transmitted after being integrated into a single system, instead of being independently operated.

Hereinafter, various example embodiments of the disclosure will be described by taking LTE, LTE-A, LTE-Pro, or NR system as an example, but embodiments of the disclosure may be applied to other communication systems having a similar technical background or channel form. In addition, embodiments of the disclosure may be applied to other communication systems through some modifications within the scope of without largely departing from the scope of the disclosure by the judgment of those skilled in the art.

The disclosure generally relates to a method and apparatus for repeatedly transmitting data and a control signal between a terminal and multiple transmission nodes performing cooperative communication for the enhancement of communication reliability.

According to the disclosure, when network cooperative communication is used in a wireless communication system, reliability of data/control signal reception of a terminal may be enhanced.

Hereinafter, a frame structure of a 5G system will be described in greater detail below with reference to the accompanying drawings.

FIG. 1 is a diagram illustrating an example time-frequency domain transmission structure of an LTE system, an LTE-A system, an NR system, or a wireless communication system similar thereto according to an embodiment.

FIG. 1 illustrates the basic structure of a time-frequency domain that is a wireless resource area in which data or a control channel is transmitted in the 5G system. Referring to FIG. 1, a horizontal axis represents a time domain and a vertical axis represents a frequency domain in FIG. 1. A basic unit of a resource in the time-frequency domain may be a resource element (RE) 1-01, and may include 1 orthogonal frequency-division multiplexing (OFDM) symbol 1-02 in the time axis and to be 1 subcarrier 1-03 in the frequency axis. $N_{SC}^{RB}$ (for example, 12) consecutive REs may include one resource block (RB) 1-04 in the frequency domain.

Figure 2:
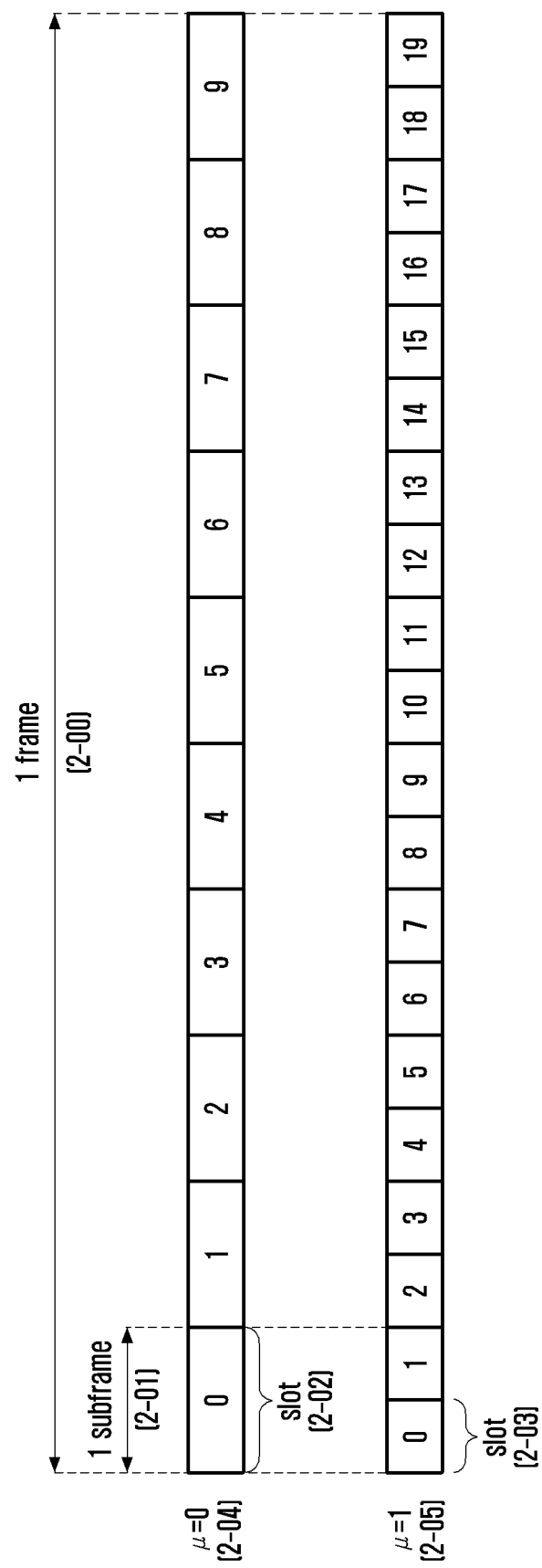
FIG. 2 is a diagram illustrating example structures of a frame, a subframe, and a slot in a $5^{th}$ generation (5G) system according to an embodiment.

FIG. 2 is a diagram illustrating example structures of a frame, a subframe, and a slot in a 5G system according to an embodiment.

FIG. 2 illustrates a slot structure considered in a 5G system. Referring to FIG. 2, an example of a structure of a frame 2-00, a subframe 2-01, and a slot 2-02 is illustrated in FIG. 2. The length of one frame 2-00 may, for example, be 10 ms. The length of one subframe 2-01 may, for example, be 1 ms. Accordingly, a total of 10 subframes 2-01 may comprise one frame 2-00. One slot 2-02 or 2-03 may, for example, be 14 OFDM symbols (e.g., the number of symbols for one slot $N_{symb}^{slot}$=14). One slot or multiple slots 2-02 or 2-03 may comprise one subframe 2-01. The number of slots 2-02 or 2-03 for each subframe 2-01 may be different depending on a configuration value μ 2-04 or 2-05 for a subcarrier spacing. In an example of FIG. 2, for the subcarrier spacing configuration value, the case of μ=0 (2-04) and the case of μ=1 (2-05) are illustrated. In the case of μ=0 (2-04), one slot 2-02 may comprise one subframe 2-01. In the case of μ=0 (2-05), two slots 2-03 may comprise one subframe 2-01. That is, depending on the subcarrier spacing configuration value μ, the number of slots for one subframe $N_{slot}^{subframe,\mu}$ may be different and, accordingly the number of slots for one frame $N_{slot}^{subframe,\mu}$ may be different. $N_{slot}^{subframe,\mu}$ and $N_{slot}^{frame,\mu}$ according to each subcarrier spacing configuration value may be defined as shown in [Table 1] below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| $\mu$ | $N_{symb}^{slot}$ | $N_{slot}^{frame, \mu}$ | $N_{slot}^{subframe, \mu}$ |
|---|---|---|---|
| 4 | 14 | 160 | 16 |
| 5 | 14 | 320 | 32 |

In NR, the maximum 250 or more RBs may comprise one component carrier (CC) or serving cell. Accordingly, when a terminal always receives the entire serving cell bandwidth as in the case of LTE, the terminal may overconsume power. To overcome the over-consumption of power, a base station may configure one or more bandwidth parts (BWPs) for the terminal and support the terminal so that the terminal may change a reception area in a cell. In NR, the base station may configure an "initial BWP", which is a bandwidth of CORE-SET #0 (or a common search space (CSS)), for the terminal through a master information block (MIB). Thereafter, the base station may configure the initial BWP (first BWP) of the terminal via RRC signaling and notify of at least one piece of BWP configuration information that may be indicated via downlink control information (DCI) later. The base station may indicate, to the terminal, which bandwidth to be used by the terminal by notifying of a BWP ID via DCI. If the terminal fails to receive the DCI in a currently assigned BWP for a particular time or more, the terminal may attempt to receive the DCI by regressing to a "default BWP".

Figure 3:
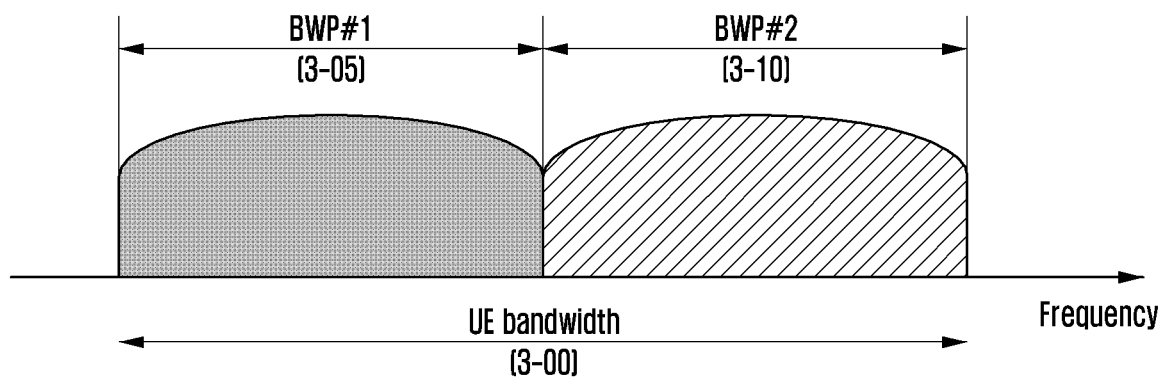
FIG. 3 is a diagram illustrating an example of a configuration of a bandwidth part in a wireless communication system according to an embodiment.

FIG. 3 is a diagram an example configuration of a bandwidth part in a wireless communication system according to an embodiment.

FIG. 3 illustrates an example of a configuration of a bandwidth part in the 5G communication system. Referring to FIG. 3, an example showing that a terminal bandwidth 3-00 is configured to be two bandwidth parts, e.g., bandwidth part #1 (BWP #1) 3-05 and bandwidth part #2 (BWP #2) 3-10 is illustrated. The base station may configure one bandwidth part or multiple bandwidth parts for the terminal and configure information as shown in [Table 2] below for each bandwidth part.

TABLE 2

| | |
|---|---|
| Configuration information 1 | A bandwidth in a bandwidth part (The number of PRBs comprising a bandwidth part) |
| Configuration information 2 | A frequency position of a bandwidth part (This information may include an offset value with respect to a reference point, wherein the reference point may include, for example, a center frequency of a carrier, a synchronization signal, a synchronization signal raster, and the like.) |
| Configuration information 3 | Numerology of a bandwidth part (For example, a subcarrier spacing, a length of a cyclic prefix (CP), and the like) |
| Others | |

Various parameters related to a bandwidth part, other than the configuration information described in [Table 2] above may be configured for the terminal. The above-described information may be transferred to the terminal by the base station via higher-layer signaling, for example, RRC signaling. The configured bandwidth part or at least one of the configured multiple bandwidth parts may be activated. Whether to activate the configured bandwidth part may be transferred to the terminal by the base station semi-statically via RRC signaling or dynamically via a medium access control (MAC) control element (CE) or DCI.

The above-described configuration of the bandwidth part supported in the 5G commination system may be used for various purposes.

In one example, when a bandwidth supported by the terminal has a smaller value than that of a system bandwidth, the bandwidth supported by the terminal may be supported. For example, in [Table 2], as a frequency position of a bandwidth part (configuration information 2) is configured for the terminal, the terminal may transmit or receive data at a particular frequency position in the system bandwidth.

In another example, in order to support different numerologies, the base station may configure multiple bandwidth parts for the terminal. For example, in order to support data transmission or reception using not only 15 kHz of subcarrier spacing but also 30 kHz of subcarrier spacing to a predetermined terminal, two bandwidth parts may be configured to use 15 kHz of subcarrier spacing and 30 kHz of subcarrier spacing, respectively. Different bandwidth parts may be frequency-division multiplexed (FDM), and in the case of transmitting or receiving data at a particular subcarrier spacing, the bandwidth part configured to a corresponding subcarrier spacing may be activated.

In another example, in order to reduce power consumption of the terminal, the base station may configure bandwidth parts having different sizes of bandwidths from each other for the terminal. For example, when the terminal supports a bandwidth having a very large value, e.g., 100 MHz of bandwidth, and always transmits or receives data using a corresponding bandwidth, a very large amount of power may be consumed. For example, in the case having no traffic, unnecessary monitoring of a downlink control channel for 100 MHz of bandwidth by the terminal may be considered to be inefficient in view of power consumption. Accordingly, in order to reduce power consumption of the terminal, the base station may configure a bandwidth part having a relatively small value, e.g., 20 MHz of bandwidth part for the terminal. In the case having no traffic, the terminal may perform monitoring using 20 MHz of bandwidth part, and the terminal may transmit or receive data using 100 MHz of bandwidth part according to the indication of the base station.

Figure 4:
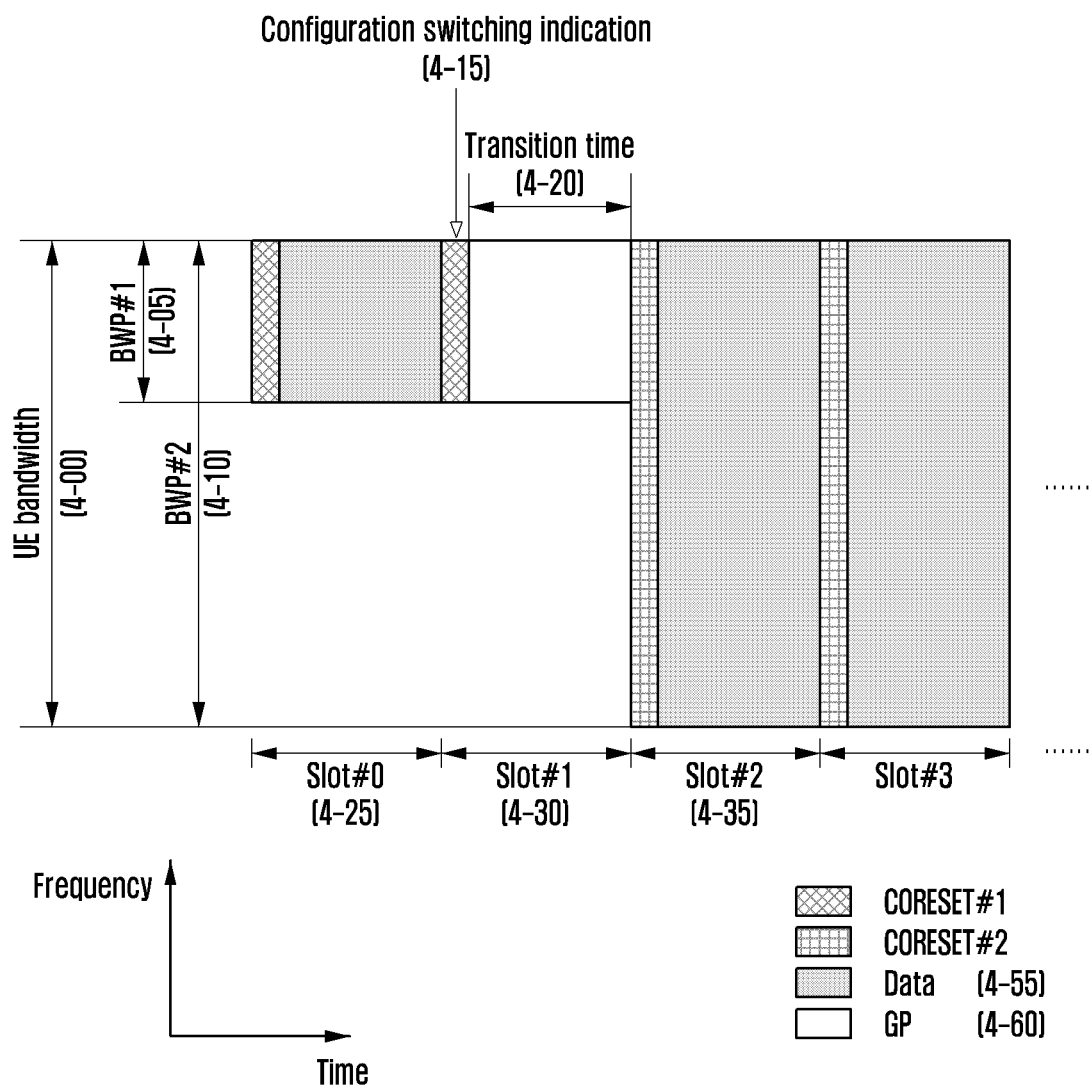
FIG. 4 is a diagram illustrating an example of indication and switching of a bandwidth part in a wireless communication system according to an embodiment.

FIG. 4 is a diagram illustrating an example of indication and switching of a bandwidth part in a wireless communication system according to an embodiment.

FIG. 4 illustrates a dynamic configuration change method for a bandwidth part. Referring to FIG. 4, as shown in [Table 2], the base station may configure one bandwidth part or multiple bandwidth parts for the terminal and may notify the terminal of information on a bandwidth of a bandwidth part, a frequency position of a bandwidth part, numerology of a bandwidth part, and the like, through the configuration for each bandwidth part. In FIG. 4, an example showing that two bandwidth parts, e.g., bandwidth part #1 (BWP #1) 4-05 and bandwidth part #2 (BWP #2) 4-10, in a terminal bandwidth 4-00 are configured for one terminal is illustrated. Among the configured bandwidth parts, one bandwidth part or multiple bandwidth parts may be activated. In FIG. 4, an example showing that one bandwidth part is activated may be considered. FIG. 4 illustrates that bandwidth part #1 (BWP #1) 4-05 among the bandwidth parts configured in slot #0 (4-25) is activated, the terminal may monitor a physical downlink control channel (PDCCH) in control area #1 (4-45) configured for bandwidth part #1 (BWP #1) 4-05, and data 4-55 may be transmitted or received in bandwidth part #1 (BWP #1) 4-05. Depending on the activated bandwidth part among the configured bandwidth parts, a control area in which the terminal receives a PDCCH may be different, and accordingly a bandwidth in which the terminal monitors the PDCCH may be different.

The base station may additionally transmit an indicator for switching the configuration for the bandwidth part to the terminal. The switching of the configuration bandwidth part may be considered to be the same as an operation of activating a particular bandwidth part (for example, changing activation from bandwidth part A to bandwidth part B). The base station may transmit a configuration switching indication to the terminal in a particular slot. After receiving the configuration switching indication from the base station, the terminal may apply the configuration switched according to the configuration switching indication, from a particular time point, determine a bandwidth part to be activated, and monitor a PDCCH in a control area configured for the activated bandwidth part.

In FIG. 4, the base station may transmit a configuration switching indication 4-15 indicating the switching of the activated bandwidth part from existing bandwidth part #1 (BWP #1) 4-05 to bandwidth part #2 (BWP #2) 4-10, to a terminal in slot #1 4-30. After receiving a corresponding indication, the terminal may activate bandwidth part #2 (BWP #2) 4-10 according to the detail of the indication. In this case, a transition time 4-20 for switching the bandwidth part may be required, and accordingly a time point at which a bandwidth part to be activated is switched and applied may be determined. FIG. 4 illustrates an example in which a transition time 4-20 corresponding to one slot is taken after the configuration switching indication 4-15 is received. During the transmission time 4-20, data transmission or reception may not be performed 4-60. Accordingly, in slot #2 (4-35), bandwidth part #2 (BWP #2) 4-10 may be activated and an operation of transmitting or receiving a control channel or data may be performed using a corresponding bandwidth part.

The base station may preconfigure one bandwidth part or multiple bandwidth parts via higher-layer signaling (for example, RRC signaling, etc.) for the terminal and may indicate activation according to a method in which the configuration switching indication 4-15 is mapped to one of the bandwidth part configuration preconfigured by the base station. For example, a $\log_2$ N-bit indication may select and indicate one of N preconfigured bandwidth parts. An example for indicating configuration information on a bandwidth part, using a 2-bit indication is described as shown in [Table 3] below.

TABLE 3

| Indication value | Bandwidth part configuration |
|---|---|
| 00 | Bandwidth configuration A configured via higher-layer signaling |
| 01 | Bandwidth configuration B configured via higher-layer signaling |
| 10 | Bandwidth configuration C configured via higher-layer signaling |
| 11 | Bandwidth configuration D configured via higher-layer signaling |

The configuration switching indication 4-15 for the described bandwidth part illustrated in FIG. 4 may be transferred from the base station to the terminal in the form of MAC CE signaling or L1 signaling (e.g., common DCI, group-common DCI, terminal-specific DCI, etc.). A time point from which bandwidth part activation starts to be applied according to the configuration switching indication 4-15 illustrated in FIG. 4 may be determined according to the following description. The time point from which the continuation switching is applied may be determined according to a predefined value (e.g., applying the configuration switching after N ($\geq$1) slots once the configuration switching indication is received), may be configured for the terminal via higher-layer signaling (e.g., RRC signaling) by the base station, or may be partially included in the detail of the configuration switching indication 4-15 and transmitted. Alternatively, the time point from which the continuation switching is applied may be determined according to a combination of the above-described schemes. After receiving the configuration switching indication 4-15 for the bandwidth part, the terminal may apply the switched configuration from the time point at which the indication is acquired according to the above-described scheme.

Hereinafter, a downlink control channel in the 5G communication system will be described in greater detail with reference to the drawings.

Figure 5:
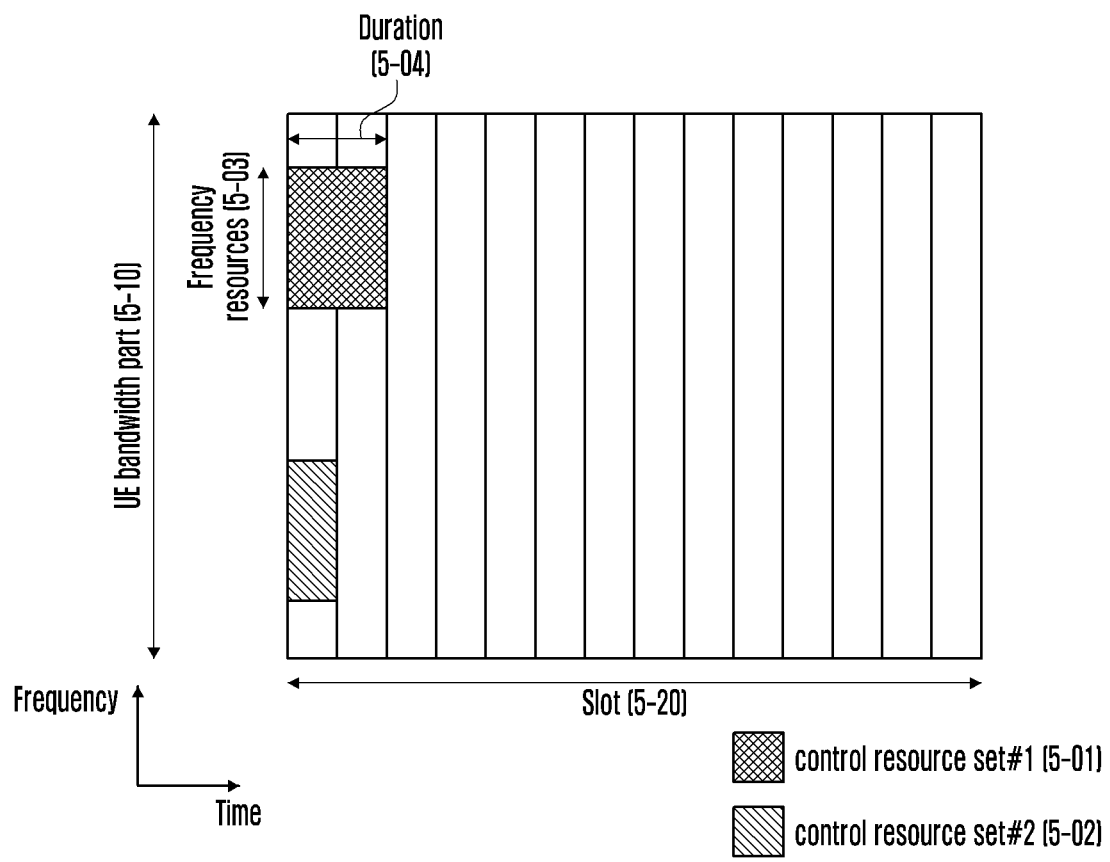
FIG. 5 is a diagram illustrating an example of the control area configuration of a downlink control channel in a wireless communication system according to an embodiment.

FIG. 5 is a diagram illustrating an example of the control area configuration of a downlink control channel in a wireless communication system according to an embodiment.

FIG. 5 illustrates an example of a control area (a control resource set (CORESET)) in which a downlink control channel is transmitted in the 5G wireless communication system. Referring to FIG. 5, an example showing that terminal bandwidth part 5-10 is configured in the frequency axis and two control resource sets (control resource set #1 (CORESET #1) 5-01 and control resource set #2 (CORESET #2) 5-02) is configured in one slot 5-20 in the time axis is illustrated in FIG. 5. The control resource sets 5-01 and 5-02 may be configured for a particular frequency resource 5-03 in the entire terminal bandwidth part 5-10 in the frequency axis. The control resource sets 5-01 and 5-02 may be configured to be one OFDM symbol or multiple OFDM symbols in the time axis and may refer, for example, to a control area duration (a control resource set duration) 5-04. In an example of FIG. 5, control resource set #1 (5-01) is configured to be a control resource set duration of two symbols and control resource set #2 (5-02) is configured to be a control resource set duration of one symbol.

The above-described control area in the 5G system may be configured for the terminal by the base station via higher-layer signaling (e.g., system information, a master information block (MIB), and radio resource control signaling). Configuring a control area for a terminal may indicate providing an identifier of a control area, a frequency position of a control area, a symbol duration of a control area, and the like for the terminal. For example, information shown in [Table 4] may be included.

TABLE 4

```
ControlResourceSet ::=            SEQUENCE {
    -- Corresponds to L1 parameter 'CORESET-ID'
    controlResourceSetId          ControlResourceSetId,
    (control resource set identifier(Identity))
    frequencyDomainResources      BIT STRING (SIZE (45)),
```

TABLE 4-continued

```
    (frequency axis resource assignment information)
    duration                          INTEGER (1..maxCoReSetDuration),
    (time axis resource assignment information)
    cce-REG-MappingType               CHOICE {
    (CCE-to-REG mapping scheme)
      interleaved                     SEQUENCE {
        reg-BundleSize                  ENUMERATED {n2, n3, n6},
        (REG bundle size)
        precoderGranularity             ENUMERATED  {sameAsREG-
bundle, allContiguousRBs},
        interleaverSize                 ENUMERATED   {n2, n3,
n6}
        (interleaver size)
        shiftIndex
        INTEGER(0..maxNrofPhysicalResourceBlocks-1)
        (interleaver shift)
      },
      nonInterleaved                  NULL
    },
    tci-StatesPDCCH                   SEQUENCE(SIZE
(1..maxNrofTCI-StatesPDCCH)) OF TCI-StateId
    (QCL configuration information)
    tci-PresentInDCI                  ENUMERATED {enabled}
}
```

In [Table 4], tci-StatesPDCCH (simply referred to as "TCI state") configuration information may include information of indices of one or more synchronization signal (SS)/physical broadcast channel (PBCH) blocks or channel state information reference signals (CSI-RSs) in a quasi-co-located (QCL) relationship with a demodulation reference signal transmitted in a corresponding control area.

Hereinafter, methods for allocating time and frequency resources for data transmission in the NR system are described.

In the NR system, in addition to the frequency-domain resource candidate allocation through a BWP indication, frequency-domain resource allocation (FD-RA) methods may be provided in detail as below.

Figure 6:
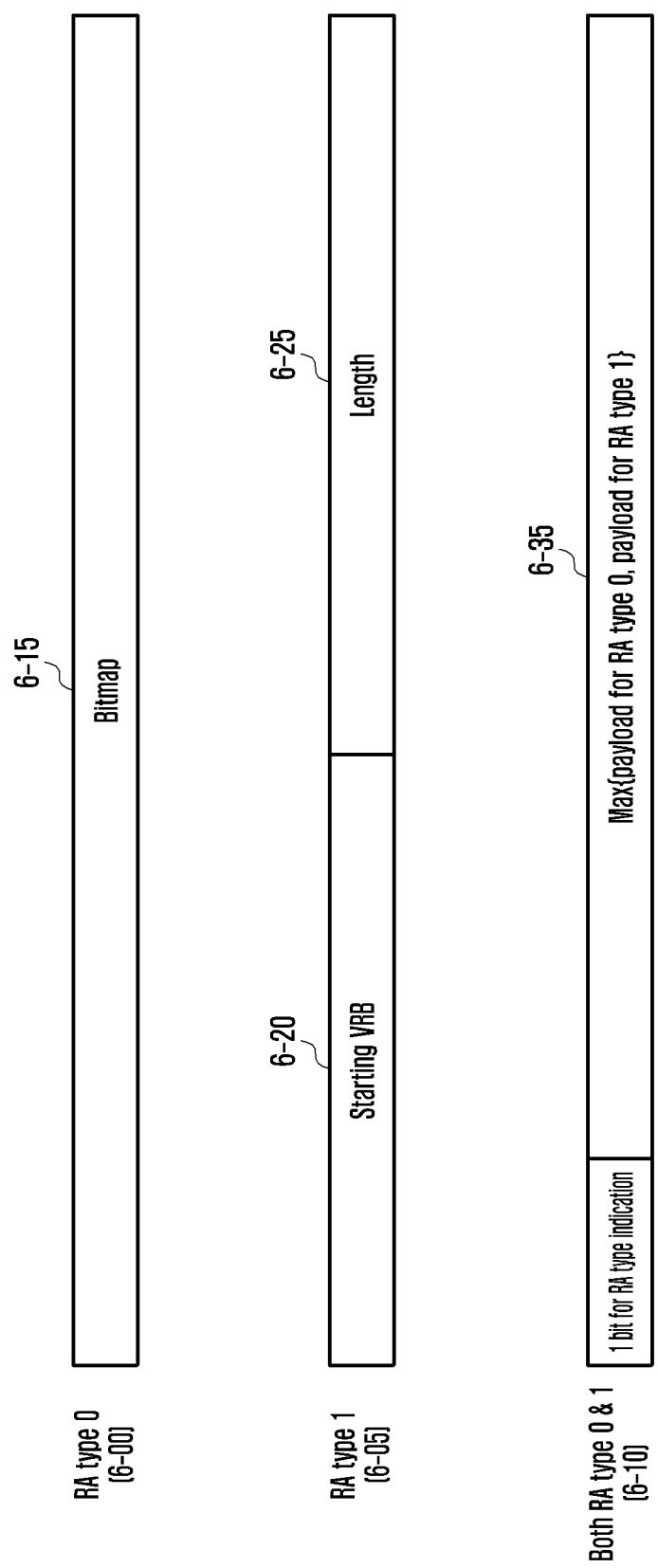
FIG. 6 is a diagram illustrating an example of allocating a physical downlink shared channel (PDSCH) frequency-domain resource in a wireless communication system according to an embodiment.

FIG. 6 is a diagram illustrating an example PDSCH frequency-domain resource allocation example in a wireless communication system according to an embodiment.

FIG. 6 illustrates three frequency-domain resource allocation methods of type 0 (6-00), type 1 (6-05) and a dynamic switch 6-10, which are configurable via higher-layer signaling in the NR system.

Referring to FIG. 6, in the case in which the terminal is configured, via higher-layer signaling, to use resource type 0 (6-00) only, partial pieces of downlink control information (DCI) allocating a PDSCH to a corresponding terminal may have a bitmap including $N_{RBG}$ bits. The condition for satisfying this case will be described again later. The $N_{RBG}$ may refer, for example, to the number of resource block groups (RBGs) determined according to the BWP size allocated by a BWP indicator and the high-layer parameter rbg-size as shown in [Table 5] below and data is transmitted to an RBG indicated by 1 according to the bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In the case in which the terminal is configured, via higher-layer signaling, to use resource type 1 (6-05) only, partial pieces of DCI allocating a PDSCH to a corresponding terminal may have frequency-domain resource allocation information including $[\log_2(N_{RB}^{DL,BWP}(N_{RB}^{DL,BWP}+1)/2]$ bits. The condition for satisfying this case will be described again later. The base station may configure a starting VRB 6-20 and a frequency-domain resource length 6-25 consecutively allocated from the starting VRB 6-20.

In the case in which the terminal is configured, via higher-layer signaling, to use both resource type 0 and resource type 1 (6-10), partial pieces of DCI allocating a PDSCH to a corresponding terminal may have frequency-domain resource allocation information including bits having a greater value 6-35 between a payload 6-15 for configuring resource type 0 and a payload 6-20 or 6-25 for configuration resource type 1. The condition for satisfying this case will be described again later. One bit may be added to a most significant bit (MSB) of the frequency-domain resource allocation information in the DCI, when a corresponding bit is 0, it may be indicated that resource type 0 is used, and when a corresponding bit is 1, it may be indicated that resource type 1 is used.

Figure 7:
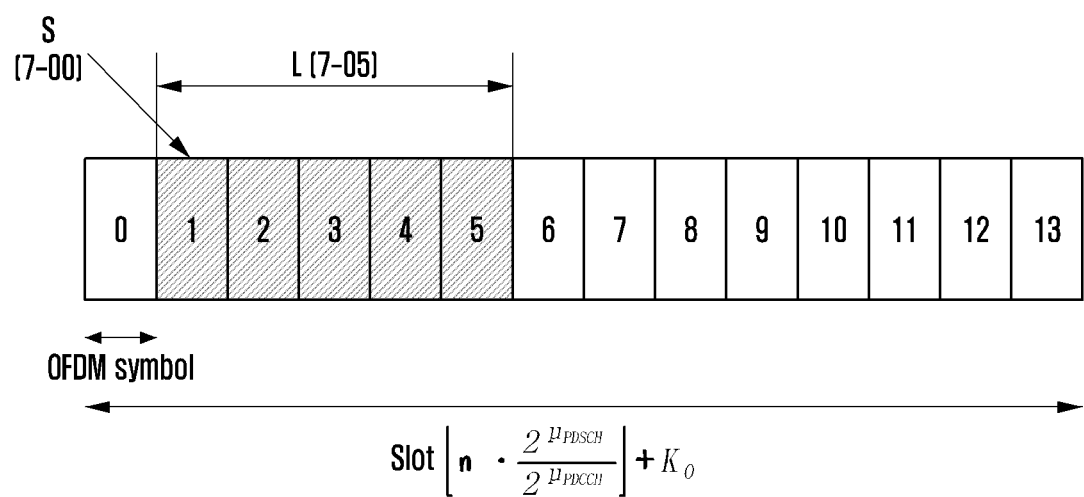
FIG. 7 is a diagram illustrating an example of allocating a PDSCH time-domain resource in a wireless communication system according to an embodiment.

FIG. 7 is a diagram illustrating an example of physical downlink shared channel (PDSCH) time-domain resource allocation in a wireless communication system according to an embodiment.

FIG. 7 illustrates an example of time-domain resource allocation in the NR system. Referring to FIG. 7, the base station may indicate the time-domain position of a PDSCH resource according to a starting position 7-00 and a length 7-05 of an OFDM symbol in one slot, which are dynamically indicated through DCI, a scheduling offset ($K_0$) value, and subcarrier spacings (SCSs) ($\mu_{PDSCH}$ and $\mu_{PDCCH}$) of a data channel and a control channel configured via higher-layer signaling.

Figure 8:
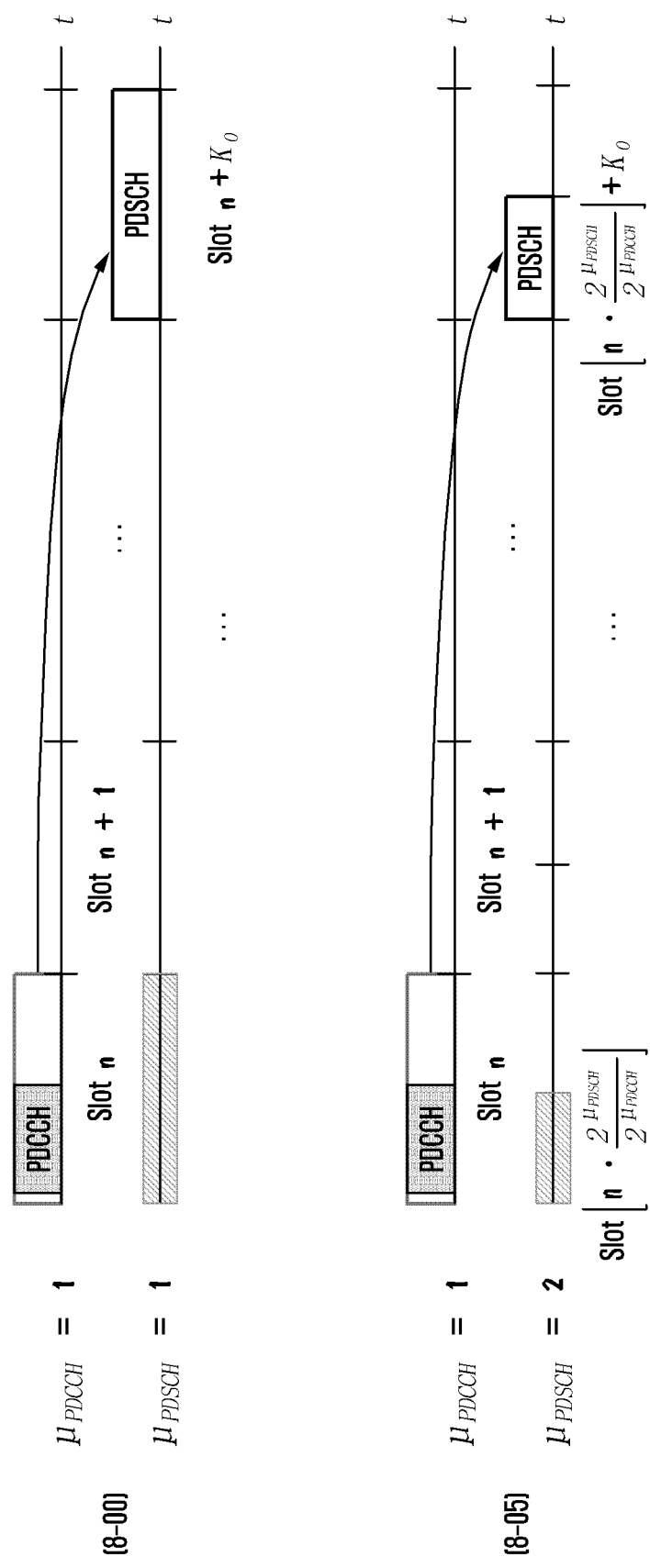
FIG. 8 is a diagram illustrating an example of allocating a time-domain resource according to a subcarrier spacing of a control channel and a data channel in a wireless communication system according to an embodiment.

FIG. 8 is a diagram illustrating an example of allocating a time-domain resource according to a subcarrier spacing of a control channel and a data channel in a wireless communication system according to an embodiment.

Referring to FIG. 8, in the case in which the subcarrier spacing of the data channel and the subcarrier spacing of the control channel are identical ($\mu_{PDSCH}=\mu_{PDCCH}$) 8-00, since a slot number for the data channel and a slot number of the control channel are identical, the base station and the terminal may know a scheduling offset occurring in accordance with a predetermined slot offset $K_0$. Meanwhile, in the case in which the subcarrier spacing of the data channel and the subcarrier spacing of the control channel are different ($\mu_{PDSCH} \neq \mu_{PDCCH}$) 8-05, since a slot number for the data channel and a slot number of the control channel are different, the base station and the terminal may know a scheduling offset occurring with reference to the subcarrier spacing of the PDCCH and in accordance with a predetermined slot offset $K_0$.

In the NR system, in order to efficiently receive a control channel of the terminal, various types of DCI format are provided as shown in [Table 6] below.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, in order to allocating (scheduling) a PDSCH to one cell, the base station may use DCI format 0_0 or DCI format 0_1.

When the DCI format 0_1 is transmitted together with a CRC scrambled by a cell radio network temporary identifier (C-RNTI), a configured scheduling RNTI (CS-RNTI), or new-RNTI, the DCI format 0_1 may include at least following pieces of information:

Identifier for DCI formats (1 bit): This indicates a DCI format identifier and is always configured to be 1.

Frequency-domain resource assignment ($N_{RBG}$ bits or $\lceil \log_2(N_{RB}^{DL,BWP}(N_{RB}^{DL,BWP}+1)/2) \rceil$ bits: This indicates frequency-domain resource assignment. If the DCI format 1_0 is monitored in a UE specific search space, $N_{RB}^{DL,BWP}$ is the size of an active DL BWP. Otherwise, $N_{RB}^{DL,BWP}$ is the size of an initial DL BWP. $N_{RBG}$ corresponds to a resource block group number. The above-described frequency-domain resource assignment is referenced for a more detailed scheme.

Time-domain resource assignment (0-4 bits): This indicates time-domain resource assignment according to the description above.

VRB-to-PRB mapping (1 bit): In the case of 0, this indicates non-interleaved VRP-to-PRB mapping, and in the case of 1, this indicates interleaved VRP-to-PRB mapping.

Modulation and coding scheme (5 bits): This indicates a modulation order and coding rate used for PDSCH transmission.

New data indicator (1 bit): This indicates that the PDSCH is either initial transmission or retransmission depending on whether or not it is toggled.

Redundancy version (2 bits): This indicates a redundancy version used for PDSCH transmission.

HARQ process number (4 bits): This indicates a HARQ process number used for PDSCH transmission.

Downlink assignment index (2 bits): DAI indicator

TPC command for scheduled PUCCH (2 bits): PUCCH power control indicator

PUCCH resource indicator (3 bits): This is a PUCCH resource indicator and indicates one of eight resources configured via higher-layer signaling.

PDSCH-to-HARQ_feedback timing indicator (3 bits): This is an HARQ feedback timing indicator and indicates one of eight feedback timing offsets configured via higher-layer signaling.

When the DCI format 1_1 is transmitted together with a CRC scrambled by a cell radio network temporary identifier (C-RNTI), a configured scheduling RNTI (CS-RNTI), or new-RNTI, the DCI format 1_1 may include at least following pieces of information:

Identifier for DCI formats (1 bit): This indicates a DCI format identifier and is always configured to be 1.

Carrier indicator (0 or 3 bits): This indicates a CC (or a cell) in which a PDSCH assigned by corresponding DCI is transmitted.

Bandwidth part indicator (0, 1, or 2 bits): This indicates a BWP in which a PDSCH assigned by corresponding DCI is transmitted.

Frequency-domain resource assignment (determined by the frequency-domain resource assignment payload): This indicates frequency-domain resource assignment and $N_{RB}^{DL,BWP}$ is the size of an active DL BWP. The above-described frequency-domain resource assignment is referenced for a more detailed scheme.

Time-domain resource assignment (0-4 bits): This indicates time-domain resource assignment according to the description above.

VRB-to-PRB mapping (0 or 1 bit): In the case of 0, this indicates non-interleaved VRP-to-PRB mapping, and in the case of 1, this indicates interleaved VRP-to-PRB mapping. When the frequency-domain resource assignment is configured to be resource type 0, this is 0 bit.

PRB bundling size indicator (0 or 1 bit): When higher-layer parameter prb-BundlingType is not configured or is configured to be "static", this is 0 bit. When higher-layer parameter prb-BundlingType is configured to be "dynamic", this is 1 bit.

Rate matching indicator (0, 1, or 2 bits): This indicates a rate matching pattern.

ZP CSI-RS trigger (0, 1, or 2 bits): This is an indicator triggering an aperiodic ZP CSI-RS.

For transport block 1:

Modulation and coding scheme (5 bits): This indicates a modulation order and coding rate used for PDSCH transmission.

New data indicator (1 bit): This indicates that the PDSCH is either initial transmission or retransmission depending on whether or not it is toggled.

Redundancy version (2 bits): This indicates a redundancy version used for PDSCH transmission.

For transport block 2:

Modulation and coding scheme (5 bits): This indicates a modulation order and coding rate used for PDSCH transmission.

New data indicator (1 bit): This indicates that the PDSCH is either initial transmission or retransmission depending on whether or not it is toggled.

Redundancy version (2 bits): This indicates a redundancy version used for PDSCH transmission.

HARQ process number (4 bits): This indicates a HARQ process number used for PDSCH transmission.

Downlink assignment index (0, 2, or 4 bits): DAI indicator

TPC command for scheduled PUCCH (2 bits): PUCCH power control indicator
PUCCH resource indicator (3 bits): This is a PUCCH resource indicator and indicates one of eight resources configured via higher-layer signaling.
PDSCH-to-HARQ_feedback timing indicator (3 bits): This is an HARQ feedback timing indicator and indicates one of eight feedback timing offsets configured via higher-layer signaling.
Antenna port (4, 5, or 6 bits): This indicates a DMRS port and CDM group without data.
Transmission configuration indication (0 or 3 bits): TCI indicator
SRS request (2 or 3 bits): SRS transmission request indicator
CBG transmission information (0, 2, 4, 6, or 8 bits): This is an indicator indicating whether code block groups in the assigned PDSCH are transmitted. 0 may refer, for example, to a corresponding CBG not being transmitted and 1 may refer, for example, to a corresponding CBG being transmitted.
CBG flushing out information (0 or 1 bit): This is an indicator indicating whether preceding CBGs are contaminated. 0 may refer, for example, to the preceding CBGs being contaminated and 1 may refer, for example, to the preceding CBGs being used (combinable) at the time of receiving retransmission.
DMRS sequence initialization (0 or 1 bit): DMRS scrambling ID selection indicator The number of pieces of DCI having different sizes, which may be received for each slot in a corresponding cell by a terminal, is 4 in maximum. The number of pieces of DCI having different sizes and scrambled by the C-RNTI, which may be received for each slot in a corresponding cell by a terminal, is 3 in maximum.

The antenna port indication may be indicated as shown in [Table 7] to [Table 10] below.

TABLE 7

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 8

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |

TABLE 8-continued

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 30 | 2 | 0, 2, 4, 6 | 2 | | | | |
| 31 | Reserved | Reserved | Reserved | | | | |

TABLE 9

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 10

Antenna port(s) (1000 + DMRS port, dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 5, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |

TABLE 10-continued

Antenna port(s) (1000 + DMRS port, dmrs-Type = 2, maxLength = 2)

| | One codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

[Table 7] is a table which may be used when dmrs-Type is indicated to be 1 and maxLength is indicated to be 1. [Table 8] is a table which may be used when dmrs-Type is indicated to be 1 and maxLength is indicated to be 2. A DMRS port being used is indicated using [Table 9] when dmrs-Type is 2 and maxLength is 1 and is indicated using [Table 10] when dmrs-Type is 2 and maxLength is 2. The numbers 1, 2, and 3 indicated by "number of DMRS CDM group(s) without data" in [Table 7] to [Table 10] may refer, for example, to CDMR groups {0}, {0,1}, and {0, 1, 2}, respectively. DMRS port(s) indicate indices of ports being used in a sequential position. The antenna port is indicated to be DMRS+1000. A CDM group of a DMRS is connected to a scheme of generating a DMRS sequence and an antenna port as shown in [Table 11] and [Table 12]. [Table 11] shows parameters in the case of using dmrs-Type=1 and [Table 12] shows parameters in the case of using dmrs-Type=2.

TABLE 11

Parameters for PDSCH DM-RS dmrs-type = 1.

| | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

Parameters for PDSCH DM-RS dmrs-type = 2.

| p | CDM group λ | Δ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The DMRS sequence according to each parameter may be determined by [Equation 1] below.

$$a_{k,l}^{(p,\mu)} = \beta_{PDSCH}^{DMRS} w_f(k') w_t(l') r(2n + k')$$ [Equation 1]

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

In [Table 7] and [Table 8], when only one codeword is enabled, rows 2, 9, 10, 11, and 30 are used only for single user MIMO only. That is, in this case, the terminal may not assume that another terminal is co-scheduled and may not perform a multiple user MIMO reception operation such as an operation of canceling, nulling, or whitening the multiple user interference.

In [Table 9] and [Table 10], when only one codeword is enabled, rows 2, 10, and 23 are used only for single user MIMO only. That is, in this case, the terminal may not assume that another terminal is co-scheduled and may not perform a multiple user MIMO reception operation such as an operation of canceling, nulling, or whitening the multiple user interference.

FIG. 9 is a diagram illustrating an example of a cooperative communication antenna port configuration according to an embodiment.

Referring to FIG. 9, an example of allocating a transmission reception point (TRP)-specific wireless resource according to a joint transmission (JT) technique and situation is illustrated.

In FIG. 9, 9-00 illustrates coherent joint transmission (C-JT) supporting coherent precoding between cells, TRPs, and/or beams.

In the C-JP, transmission reception point (TRP) A 9-05 and TRP B 9-10 transmit the same data (a PDSCH) and joint precoding is performed in multiple TRPs. This may refer, for example, to TRP A 9-05 and TRP B 9-10 transmitting the same DMRS ports (for example, both TRPs transmit DMRS port A and B) for the same PDSCH transmission. In this case, the terminal may receive one piece of DCI information for receiving one PDSCH demodulated based on a DMRS transmitted through DMRS port A and B.

In FIG. 9, 9-20 illustrates non-coherent joint transmission (NC-JT) supporting non-coherent precoding between cells, TRPs, and/or beams. In the case of NC-JT, the cells, TRPs, and/or beams transmit different PDSCHs and individual precoding may be applied for each PDSCH. This may refer, for example, to TRP A 9-25 and TRP B 9-30 transmitting different DMRS ports (for example, TRP A transmits DMRS port A and TRP B transmits DMRS port B) for different PDSCH transmission. In this case, the terminal may receive two types of DCI information for receiving PDSCH A demodulated based on a DMRS transmitted through DMRS port A and PDSCH B demodulated based on a DMRS transmitted through DMRS port B.

In order to support NC-JT simultaneously providing data from two or more transmission points to one terminal, PDSCHs transmitted from two or more different transmission points through one PDCCH need to be allocated or PDSCHs transmitted from two or more different transmission points through multiple PDCCHs need to be allocated. The terminal acquires a quasi-co-located (QCL) connection relationship between reference signals or channels based on L1/L2/L3 signaling and large-scale parameters of the reference signals or channels may be efficiently estimated therethrough. When transmission points of a reference signal or a channel are different, the large-scale parameters are difficult to be shared with each other. Accordingly, when performing cooperative transmission, the base station needs to simultaneously notify the terminal of quasi-co-location information on two or more transmission points through two or more TCI states. When non-coherent joint transmission is supported through multiple PDCCHs, that is, when two or more PDCCHs allocate two or more PDSCHs to the same serving cell and the same bandwidth part at the same time point, each of the two or more TCI states may be allocated to a corresponding PDSCH or corresponding DMRS ports through a corresponding PDCCH. Meanwhile, when non-coherent cooperative transmission is supported through a single PDCCH, that is, when one PDCCH allocates two or more PDSCHs to the same serving cell and the same bandwidth part at the same time point, each of the two or more TCI states needs to be allocated to a corresponding PDSCH or corresponding DMRS ports through one PDCCH.

When it is assumed that DMRS ports allocated to the terminal at a particular time point are divided into DMRS port group A transmitted from transmission point A and DMRS port group B transmitted from transmission point B, the two or more TCI states are connected to DMRS port group, respectively, and channel estimation therefor may be performed based on different QCL assumptions for each group. Meanwhile, in order to increase channel measurement accuracy and also reduce transmission burden, the different DMRS ports may be code-division multiplexed (CDM), frequency-division multiplexed (FDM), or time-domain multiplexed (TDM). Among these, the DMRS ports being code-division multiplexed is commonly referred to as CDM group. Since code-based multiplexing is smoothly operated for the DMRS ports in the CDM group when channel properties of ports are similar (that is, since the DMRS ports in the CDM group are well distinguished by an orthogonal cover code (OCC) when channel properties of ports are similar), it is important for the DMRS ports existing in the same CDM group not to have different TCI states. The disclosure provides a method for indicating a DMRS port and CDM group without data for satisfying the property to the terminal.

Meanwhile, in the disclosure, an operation of transmitting control information through a PDCCH may be described as an operation of transmitting a PDDCH and an operation of transmitting data through a PDSCH may be described as an operation of transmitting a PDSCH, for the convenience of description.

Hereinafter, for the convenience of description, [Table 7] to [Table 12] are referred to as "first antenna port indication (or conventional antenna port indication)" and a table partially or entirely modified from among code points of [Table 7] to [Table 12] is referred to as "second antenna port indication (or new antenna port indication)". Further, the DMRS port and CDM group without data allocation is referred to as "DMRS allocation".

The terminal may determine the number of antenna ports used at the time of PDSCH transmission, from a table indicating a DMRS port. A rel-15-based antenna port indication method may be based on an index of the 4-to-6-bit-length, indicated by an antenna port field in DCI in the case of DCI format 1_1 and an antenna port may be determined therefrom. The terminal may identify information on the number of DMRS ports and indices, the number of front-load symbols, and the number of CDM groups for a PDSCH based on an indicator (an index) transmitted by the base station. Further, based on information of a transmission configuration indication (TCI) field in DCI 1_1, the terminal may determine the switching of the dynamic beamforming direction. When tci-PresentDCI is configured to be "enabled" in a higher layer, the terminal may identify the TCI field of 3-bit information and determine activated TCI states in a DL BWP or scheduled component carrier and the direction of a beam associated with a DL-RS. Meanwhile, when tci-PresentDCI is "disabled", the terminal may consider that there is no switching of the beam direction of beamforming.

In various embodiments, a scenario of allocating PDSCHs transmitted from two (or more) different transmission points through a single PDCCH is considered. A rel-15 terminal receives a PDSCH stream including a single layer or multiple layers which is QCLed based on TCI information and antenna port information in a single PDCCH. A rel-16 terminal, meanwhile, may receive data transmitted from multi-TRP or multiple base stations, in the form of C-JT/NC-JT. In order to support the C-JT/NC-JT, the rel-16 terminal needs to perform a basic higher layer configuration. For example, for the higher layer configuration, the terminal needs to receive and configure a C-JT/NC-JT-related parameter, setting value, or the like.

In the disclosure, for the base station and the terminal supporting C-JT/NC-JT, a separate DMRS port table for C-JT/NC-JT signaling transmission or reception is disclosed. The disclosed DMRS port table may be distinguished, as a separate table, from a DMRS port table indicated by an antenna port field indicating based on DCI format 1_1. The base station and the terminal may preconfigure information whether to support NC-JT in an RRC configuration as a method for distinguishing a table from the DMRS port table proposed in rel-15. That is, through the RRC configuration, a field such as "C-JT/NC-JT transmission=enabled/disabled" may be configured and according to the field, whether to support C-JT/NC-JT may be identified.

When it is configured to be "C-JT/NC-JT transmission=enabled" through higher layer signaling, a field to be used by the terminal may be indicated using the existing antenna port field in DCI format 1_1. Alternatively, at least one information among a detailed DMRS port number, the number of DMRS CDM groups without data, the (maximum) number of front-loaded symbols, and a DMRS-type may be indicated for NC-JT using a separate field except for the antenna port field in separate DCI format 1_1.

[Table 12-1] to [Table 12-4] disclose a DMRS port so that DMRS ports transmitted from the same TRP is transmitted to the same CDM group with reference to the CDM group described in [Table 11] above. In [Table 12-1] to [Table 12-4], the left and the right with reference to the semicolon (;) indicate different TPR transmission and different CDM group mapping, but the semicolon may be omitted according to an embodiment. Further, the order of values included in the table with reference to the semicolon (;) may change. Further, DMRS ports shown in the table consider the case of supporting a maximum of two DMRS ports, e.g., a first TRP and a second TRP. Further, the same basic concepts of a DMRS port, a type, the number of front-loaded symbols, and the like described in [Table 7] to [Table 10] may be applied to [Table 12-1] to [Table 12-4].

As shown in [Table 12-1], a DMRS port table for C-JT/NC-JT may be distinguished from a port not supported in rel-15 and may support different types of ports.

For example, when the base station indicates entry (or value) 0 to the terminal, the terminal may determine that the first TRP and the second TRP transmit DMRSs through DMRS port 0 and DMRS port 2, respectively. Further, the terminal, which has identified that the number of ports for each TRP is 1, may determine that single-layer transmission is performed from each of the first TRP and the second TRP.

When the base station indicates entry 1 to the terminal, the terminal may determine that the first TRP and the second TRP transmit DMRSs through DMRS port 1 and DMRS port 3, respectively. Further, the terminal, which has identified that the number of ports for each TRP is 1, may determine that single-layer transmission is performed from each of the first TRP and the second TRP. Entry 1 has different port number from entry 0, but is functionally similar to entry 0. Accordingly, entry 1 may be considered as duplication of entry 0 and omitted from the table.

When the base station indicates entry 2 to the terminal, the terminal may determine that the first TRP transmits a DMRS through DMRS ports 0 and 1 and the second TRP transmits a DMRs through DMRS port 2. Further, the terminal, which has identified that the number of ports for the first TRP is 2 and the number of ports for the second TRP is 1, may determine that 2-layer transmission is performed from the first TRP and 1-layer transmission is performed from the second TRP.

When the base station indicates entry 3 to the terminal, the terminal may determine that the first TRP transmits a DMRS through DMRS port 0 and the other second TRP transmits a DMRS through DMRS ports 2 and 3. Further, the terminal, which has identified that the number of ports for the first TRP is 1 and the number of ports for the second TRP is 2, may determine that single-layer transmission is performed from the first TRP and 2-layer transmission is performed from the other second TRP.

An operation of the base station and terminal for entry 4 and 5 may be easily understood from entry 2 and 3 described above. Entry 4 and entry 5 have different port numbers from entry 2 and entry 3, but are functionally similar to entry 2 and 3, and thus may be omitted from the table.

When the base station indicates entry 6 to the terminal, the terminal may determine that the first TRP transmits a DMRS through a DMRS ports 0 and 1 and the other second TRP transmits a DMRS through DMRS ports 2 and 3. Further, the terminal, which has identified that the number of port for each TRP is 2, may determine that 2-layer transmission is performed from each of the first TRP and the other second TRP.

[Table 12-1] shows embodiments, in an entry type, among various cases in which the base station and the terminal communicate with each other and all or partial seven entries may be applied to the actual system. Further, another table including at least one entry among entries included in [Table 12-1] may be used. Further, [Table 12-1] shows the case in which the base station transmits one codeword to the terminal, but may also be similarly applied to the case in which two or more codewords are transmitted.

[Table 12-2] shows the case of having DMRS type 1 that is identical to the case of [Table 12-1] and the maxLength (maxLength=2) that is different from that of [Table 12-1]. Referring to [Table 7] and [Table 8], the DMRS port configuration for C-JT/NC-JT may be mapped in the same form of maxLength=1 for DMRS port 0 to 3.

[Table 12-3] shows a DMRS port table for C-JT/NC-JT of DMRS type 2 that is different from DMRS type 1 described in [Table 12-1]. [Table 12-3] supports a maximum of 12 DMRS ports and is an adequate structure for a MU-MIMO type.

For example, when the base station indicates entry 1 to the terminal, the terminal may determine that the first TRP and the second TRP transmit DMRSs through DMRS port 0 and DMRS port 2, respectively. Further, the terminal, which has identified that the number of ports of each TRP is 1, may determine that single layer transmission is performed from each of the first TRP and the second TRP. The entries in [Table 12-3] show both the case in which the number of DMRS CDM groups is 2 and the case in which the number of DMRS CDM groups is 3, and it is not excluded to indicate, in divided entries, the case in which the number of DMRS CDM groups is 2 and the case in which the number of DMRS CDM groups is 3. The embodiments are shown in an entry type and all or partial 14 entries may be applied to the actual system. For example, a table may be configured by the partial entries of entries 0, 2, 3, 6, 7, 9, 10, and 13 only. Further, in the embodiment, the order of the entries is a mere embodiment, and is not intended to limit the disclosure. Further, [Table 12-3] shows the case in which the base station transmits one codeword to the terminal, but may also be similarly applied to the case in which two or more codewords are transmitted.

[Table 12-4] shows the case of having DMRS type 2 that is identical to the case of [Table 12-3] and the maxLength (maxLength=2) that is different from that of [Table 12-3]. Referring to [Table 7] and [Table 8], when DMRS ports are configured for C-JT/NC-JT, two to four DMRS ports are allocated in total, and at least one DMRS port is allocated to each CDM group. Depending on the number of front-loaded symbols, when the number of front-loaded symbols is 1, allocation is performed among DMRS ports 0-3 (this is omitted because of duplication of [Table 12-3]), and when the number of front-loaded symbols is 2, allocation is performed among DMRS ports 0-7. When total two DMRS ports are used, a frequency-domain orthogonal cover code (OCC) of each CDM group needs to be identical.

Meanwhile, a time-domain OCC of each CDM group may be identical or different. For example, both DMRS ports 0 and 2 using the same time-domain OCC in each of CDM groups {0 and 1} may be used and both DMRS ports 0 and 6 using different time-domain OCC in each of CDM groups {0 and 1} may also be used. When total three DMRS ports are used, a time-domain OCC applied to each of the CDM groups {0 and 1} may be identical or different. The embodiments are shown in an entry type and all or partial 28 entries may be applied to the actual system.

For example, a table may be configured by the partial entries of entries 0, 2, 3, 6, 7, 9, 10, and 13 only or entries of 0, 2, 3, 6, 7, 9, 10, 13, 14, 16, 17, 20, 23, 24, and 27 only. Further, in the embodiment, the order of the entries is a mere embodiment, and is not intended to limit the disclosure. Further, [Table 12-4] shows the case in which the base station transmits one codeword to the terminal, but may also be similarly applied to the case in which two or more codewords are transmitted.

[Table 12-1] DMRS indication table for antenna port(s) (1000+DMRS port), dmrs-Type=1, maxLength=1

| | One Code word (dmrs-Type = 1, maxLength = 1) | | |
|---|---|---|---|
| Entries | Number of DMRS CDM group(s) without data | DMRS port(s) | Number of front-load symbols |
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |

[Table 12-2] DMRS indication table for antenna port(s) (1000+DMRS port), dmrs-Type=1, maxLength=2

| | One Code word (dmrs-Type = 1, maxLength = 2) | | |
|---|---|---|---|
| Entries | Number of DMRS CDM group(s) without data | DMRS port(s) | Number of front-load symbols |
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |

[Table 12-3] DMRS indication table for antenna port(s) (1000+DMRS port), dmrs-Type=2, maxLength=1

| | One Code word (dmrs-Type = 2, maxLength = 1) | | |
|---|---|---|---|
| Entries | Number of DMRS CDM group(s) without data | DMRS port(s) | Number of front-load symbols |
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2 ,3 | 1 |
| 5 | 2 | 0, 1; 3 | 1 |
| 6 | 2 | 0, 1; 2, 3 | 1 |
| 7 | 3 | 0; 2 | 1 |
| 8 | 3 | 1; 3 | 1 |
| 9 | 3 | 0, 1; 2 | 1 |
| 10 | 3 | 0; 2, 3 | 1 |
| 11 | 3 | 1; 2, 3 | 1 |
| 12 | 3 | 0, 1; 3 | 1 |
| 13 | 3 | 0, 1; 2, 3 | 1 |

[Table 12-4] DMRS indication table for antenna port(s) (1000+DMRS port), dmrs-Type=2, maxLength=2

| Entries | One Code word (dmrs-Type = 2, maxLength = 2) | | |
|---|---|---|---|
| | Number of DMRS CDM group(s) without data | DMRS port(s) | Number of front-load symbols |
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |
| 7 | 3 | 0; 2 | 2 |
| 8 | 3 | 1; 3 | 2 |
| 9 | 3 | 0, 1; 2 | 2 |
| 10 | 3 | 0; 2, 3 | 2 |
| 11 | 3 | 1; 2, 3 | 2 |
| 12 | 3 | 0, 1; 3 | 2 |
| 13 | 3 | 0, 1; 2, 3 | 2 |
| 14 | 2 | 6; 8 | 2 |
| 15 | 2 | 7; 9 | 2 |
| 16 | 2 | 6, 7; 8 | 2 |
| 17 | 2 | 6, 8; 9 | 2 |
| 18 | 2 | 7; 8, 9 | 2 |
| 19 | 2 | 6; 7, 9 | 2 |
| 20 | 2 | 6, 7; 8, 9 | 2 |
| 21 | 3 | 6; 8 | 2 |
| 22 | 3 | 7; 9 | 2 |
| 23 | 3 | 6, 7; 8 | 2 |
| 24 | 3 | 6, 8; 9 | 2 |
| 25 | 3 | 7; 8, 9 | 2 |
| 26 | 3 | 6; 7, 9 | 2 |
| 27 | 3 | 6, 7; 8, 9 | 2 |

[Table 13-1] illustrates a method for using a codepoint of a reserved bit in the conventional rel-15 as a method for indicating a DMRS port by the base station to the terminal for the C-JT/NC-JT. As shown in [Table 7], a rel-15 DMRS port table uses fields from 0 to 11, and 12-15, as revered bits, are not used. According to the disclosure, a DMRS port may be indicated for cooperative transmission in which, as shown in [Table 13-1], transmission is performed from two TRPs using four codepoints of 12 to 15 in the DMRS port table. When the same reserved bits are used, the base station and the terminal do not need to allocate a separate field, thereby efficiently using DCI resources.

For example, when the base station indicates entry 12 to the terminal, the terminal may determine that the first TRP and the second TRP transmit DMRSs through DMRS port 0 and DMRS port 2, respectively. Further, the terminal, which has identified that the number of ports for each TRP is 1, may determine that single-layer transmission is performed from each of the first TRP and the second TRP.

In another example, when the base station indicates entry 13 to the terminal, the terminal may determine that the first TRP transmits a DMRS through DMRS ports 0 and 1 and the second TRP transmits a DMRs through DMRS port 2. Further, the terminal, which has identified that the number of ports for the first TRP is 2 and the number of ports for the second TRP is 1, may determine that 2-layer transmission is performed from the first TRP and 1-layer transmission is performed from the second TRP.

In another example, when the base station indicates entry 14 to the terminal, the terminal may determine that the first TRP transmits a DMRS through DMRS port 0 and the other second TRP transmits a DMRS through DMRS ports 2 and 3. Further, the terminal, which has identified that the number of ports for the first TRP is 1 and the number of ports for the second TRP is 2, may determine that single-layer transmission is performed from the first TRP and 2-layer transmission is performed from the other second TRP.

In another example, when the base station indicates entry 15 to the terminal, the terminal may determine that the first TRP transmits a DMRS through DMRS ports 0 and 1 and the other second TRP transmits a DMRS through DMRS ports 2 and 3. Further, the terminal, which has identified that the number of port for each TRP is 2, may determine that 2-layer transmission is performed from each of the first TRP and the other second TRP.

The terminal which is configured to be "C-JT/NC-JT transmission=enabled" in a higher layer may identify the residual codepoint of the existing antenna port field in DCI format 1_1 and may determine whether to support C-JT/NC-JT using a dynamic method. That is, when the antenna port field in DCI format 1_1 is 12 to 15, the terminal may identify, from the DCI, the number of TRPs used for PDSCH transmission to be scheduled, the number of layers to be transmitted, the number of DMRS CDM groups without data, and the number of front-loaded symbols. The embodiments are shown in an entry type and all or partial 4 entries may be applied to the actual system. In the embodiment, the order of the entries is a mere embodiment, and is not intended to limit the disclosure.

For example, [Table 13-2] to [Table 13-4] correspond to an embodiment in which partial DMRS ports separately generated from [Table 12-2] to [Table 12-4] are added to [Table 8] to [Table 10] defined by the rel-15 standard and duplicate DMRS ports are omitted in order to reduce the bit size. The omission is a mere embodiment and a complete table may be configured by additionally using all or partial DMRS ports indicated in [Table 12-1] to [Table 12-4]. Further, the base station may perform scheduling of joint transmission for the rel-16 NC-JT terminal, as shown in [Table 12-1] to [Table 13-4], and may also perform scheduling of single port transmission to the same DMRS port for the rel-15 terminal, so that a downlink MU-MIMO operation is performed.

In another example, since partial entries in [Table 13-1] to [Table 13-4] have the same DMRS port indices, duplicated indices may be omitted. That is, entries 12, 13, and 15 for NC-JT in [Table 13-1] have the same port indices as those of entries 11, 9, and 10, respectively and may be omitted. Further, entries 31, 32, and 34 for NC-JT in [Table 13-2] have the same port indices as those of entries 11, 9, and 10, respectively and may be omitted. Further, entries 24, 25, 27, 29, and 31 for NC-JT in [Table 13-3] have the same port indices as those of entries 23, 9, 10, 29, and 22, respectively and may be omitted. Further, entries 58, 59, 61, 63, and 65 for NC-JT in [Table 13-4] have the same port indices as those of entries 23, 9, 10, 20, and 22, respectively and may be omitted. The duplicated indices may be omitted based on one of an assumption that at least different CDM groups are not transmitted to the same port for NC-JT, an assumption that the terminal may distinguish a DMRS port for NC-JT by indication of whether to support NC-JT in TCI field, and an assumption that a DMRS port may be distinguished based on MAC CE message reception and DCI reception.

[Table 13-1] DMRS indication table for antenna port(s) (1000+DMRS port), dmrs-Type=1, maxLength=1

| | One Codeword: Codeword 0 enabled, Codeword 1 disabled | |
|---|---|---|
| Entry | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0; 2 |
| 13 | 2 | 0, 1; 2 |
| 14 | 2 | 0; 2, 3 |
| 15 | 2 | 0, 1; 2, 3 |

[Table 13-2] DMRS indication table for antenna port(s) (1000+DMRS port), dmrs-Type=1, maxLength=2

| | One Codeword: Codeword 0 enabled, Codeword 1 disabled | | |
|---|---|---|---|
| Entry | Number of DMRS CDM group(s) without data | DMRS port(s) | Number of front-load symbols |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | 2 | 0; 2 | 1 |
| 32 | 2 | 0, 1; 2 | 1 |
| 33 | 2 | 0; 2, 3 | 1 |
| 34 | 2 | 0, 1; 2, 3 | 1 |
| 35 | 2 | 0; 2 | 2 |
| 36 | 2 | 0, 1; 2 | 2 |
| 37 | 2 | 0; 2, 3 | 2 |
| 38 | 2 | 0, 1; 2, 3 | 2 |
| 39 | Reserved | Reserved | Reserved |

[Table 13-3] DMRS indication table for antenna port(s) (1000+DMRS port), dmrs-Type=2, maxLength=1

| | One codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24 | 2 | 0; 2 |
| 25 | 2 | 0, 1; 2 |
| 26 | 2 | 0; 2, 3 |
| 27 | 2 | 0, 1; 2, 3 |
| 28 | 3 | 0; 2 |
| 29 | 3 | 0, 1; 2 |
| 30 | 3 | 0; 2, 3 |
| 31 | 3 | 0, 1; 2, 3 |

[Table 13-4] DMRS indication table for antenna port(s) (1000+DMRS port), dmrs-Type=2, maxLength=2

| | One codeword: Codeword 0 enabled, Codeword 1 disabled | | | | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 48 | 1 | 0 | 2 |
| 1 | 1 | 1 | 1 | 49 | 1 | 1 | 2 |
| 2 | 1 | 0, 1 | 1 | 50 | 1 | 6 | 2 |
| 3 | 2 | 0 | 1 | 51 | 1 | 7 | 2 |
| 4 | 2 | 1 | 1 | 52 | 1 | 0, 1 | 2 |
| 5 | 2 | 2 | 1 | 53 | 1 | 6, 7 | 2 |
| 6 | 2 | 3 | 1 | 54 | 2 | 0, 1 | 2 |
| 7 | 2 | 0, 1 | 1 | 55 | 2 | 2, 3 | 2 |
| 8 | 2 | 2, 3 | 1 | 56 | 2 | 6, 7 | 2 |
| 9 | 2 | 0-2 | 1 | 57 | 2 | 8, 9 | 2 |
| 10 | 2 | 0-3 | 1 | 58 | 2 | 0; 2 | 1 |
| 11 | 3 | 0 | 1 | 59 | 2 | 0, 1; 2 | 1 |
| 12 | 3 | 1 | 1 | 60 | 2 | 0; 2, 3 | 1 |
| 13 | 3 | 2 | 1 | 61 | 2 | 0, 1; 2, 3 | 1 |
| 14 | 3 | 3 | 1 | 62 | 3 | 0; 2 | 1 |
| 15 | 3 | 4 | 1 | 63 | 3 | 0, 1; 2 | 1 |
| 16 | 3 | 5 | 1 | 64 | 3 | 0; 2, 3 | 1 |
| 17 | 3 | 0, 1 | 1 | 65 | 3 | 0, 1; 2, 3 | 1 |
| 18 | 3 | 2, 3 | 1 | 66 | 2 | 0; 2 | 2 |
| 19 | 3 | 4, 5 | 1 | 67 | 2 | 0, 1; 2 | 2 |
| 20 | 3 | 0-2 | 1 | 68 | 2 | 0; 2, 3 | 2 |
| 21 | 3 | 3-5 | 1 | 69 | 2 | 0, 1; 2, 3 | 2 |
| 22 | 3 | 0-3 | 1 | 70 | 3 | 0; 2 | 2 |
| 23 | 2 | 0, 2 | 1 | 71 | 3 | 0, 1; 2 | 2 |
| 24 | 3 | 0 | 2 | 72 | 3 | 0; 2, 3 | 2 |
| 25 | 3 | 1 | 2 | 73 | 3 | 0, 1; 2, 3 | 2 |
| 26 | 3 | 2 | 2 | 74-127 | reserved | reserved | reserved |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |

The terminal may support data transmitted from multi-TRP or multiple base stations, in the form of C-JT/NC-JT. The terminal supporting C-JT/NC-JT may receive a C-JT/NC-JT-related parameter, setting value, or the like through a higher-layer configuration and may set an RRC parameter of the terminal based thereon. For the higher-layer configuration, the terminal may use a UE capability parameter tci-State PDSCH. The UE capability parameter tci-State PDSCH defines TCI states for PDSCH transmission, wherein the number of TCI states may be configured to be 4, 8, 16, 32, 64, and 128 in FR1 and to be 64 and 128 in FR2, and among the configured numbers, the maximum eight states which may be indicated by a 3-bit TCI field of DCI through a MAC CE message may be configured. The maximum value 128 may refer, for example, to a value indicated by maxNumberConfiguredTCIstatesPerCC in the tci-StatePDSCH parameter included in the UE capability signaling. A serial configuration operation from the higher-layer configuration to the MAC CE configuration may be applied to a beamforming indication or beamforming switching command for at least one PDSCH in one TRP.

Various embodiments describe how the terminal may activate or deactivate a TCI state through different MAC CE signaling such as rel-15 and rel-16. Particularly, when a PDSCH for a particular terminal, such as DCI format 1_1, is allocated, a TCI field may be used to dynamically support a beamforming direction indication or beamforming direction switching command.

The beamforming direction indication or beamforming direction switching command may refer, for example, to an operation applied when the terminal, which has identified TCI states field information in DCI format 1_1, receives a PDSCH through a downlink after a predetermined time, and the direction may refer, for example, to a beamforming configuration direction corresponding in association with a DL RS of a QCLed base station/TRP.

The base station and the terminal may determine to use each of a rel-15 MAC CE for a rel-15 DCI format and a rel-16 MAC CE for a rel-16 DCI format. Other methods are illustrated according to a method for distinguishing the rel-15 MAC CE structure from the rel-16 MACE CE structure.

The rel-16 MAC CE may be configured to have a form of partially extending the rel-15 MAC CE message. The embodiment may be disclosed that all TCI states activated by the rel-15 MAC CE are included in TCI states activated by the rel-16 MAC CE.

Figure 10:
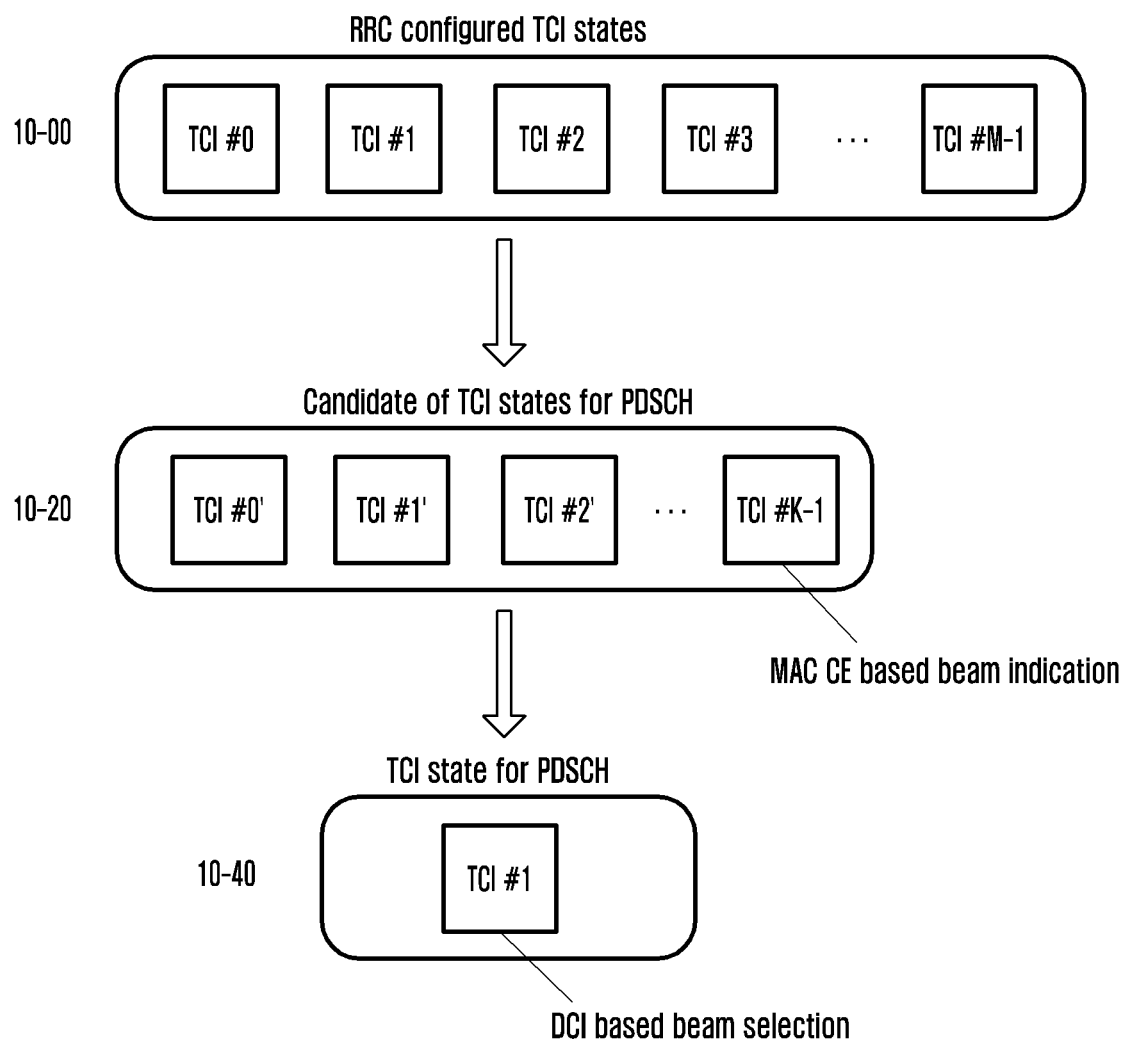
FIG. 10 is a diagram illustrating an example related to the configuration of transmission configuration indication (TCI) states and the beamforming indication according to an embodiment.

For example, as shown in FIG. 10, the base station may determine the number of all TCI states of rel-15 RRC configured TCI states 10-00 to be M, including TCI #0, TCI #1, TCI #2, ..., and TCI #M−1, and may select, as a subset 10-20 of TCI states selected by the rel-15 MAC CE, TCI #0', TCI #1', TCI #2', ..., and TCI #K−1. Meanwhile, the base station and the terminal supporting the rel-16 may separately configure RRC configured TC states supporting the rel-16 or may use the RRC configured TCI states configured in the rel-15 without change. In this case, the RRC configured TCI states supporting the rel-16 may include all or part of the RRC configured TCI states configured in the rel-15. In the case of M=128, the number of the TCI states of the rel-16 may be equal to or greater than 128. When the base station or the terminal extends the number of TCI states supported in the rel-15 proportional to the number of base stations/TRPs operated for C-JT/NC-JT in the rel-16, in the case of the operation in two TRPs, the maximum 256 TCI states may be configured. The rel-16 MAC CE may include all or part of TCI states supported by the rel-15 MAC CE to the RRC configured TCI states for the rel-16. For example, when the rel-16 MAC CE includes all TCI states supported in the rel-15 MAC CE and the number of TCI states extends proportional to the number of base stations/TRPs operated for C-JT/NC-JT in the rel-16, in the case of the operation in two TRPs, the maximum 2K TCI states may be configured.

[Table 14] shows details about the tci-StatePDSCH parameter described in the embodiment above. For example, an FR2 mandatory value of parameter maxNumberConfiguredTCIstatesPerCC may be modified from 64 to 128 or 256 or 64, 128, or 256 may be additionally added thereto for C-JT/NC-JT.

For example, the base station or the terminal supporting the rel-15 and the rel-16 may configure the maximum value for each of the rel-15 and the rel-16 for the TCI states configuration through the MAC CE and may configure the number of TCI states to be equal to or smaller than the configured maximum value. As a method for configuring the number of TCI states to be equal to or smaller than the maximum value, various embodiments may be disclosed below.

The number of TCI states activated by the MAC CE messages of the rel-15 and the rel-16 may be configured by the UE capability value reported by the terminal. According to another example, the number of TCI states activated by the MAC CE messages of the rel-15 and the rel-16 may be determined by a value preconfigured by the base station. According to another example, the number of TCI states activated by the MAC CE messages of the rel-15 and the rel-16 may be determined to a value predetermined by the base station and the terminal.

For example, as shown in FIG. 10, the base station and the terminal may determine the number of all TCI states 10-00 of rel-15 RRC configured TCI states to be M, including TCI #0, TCI #1, TCI #2, ..., and TCI #M−1, may select a subset 10-20 of the TCI states selected by the rel-15 MAC CE, and may arrange the subset to be TCI #0', TCI #1', TCI #2', ..., and TCI #K−1. When TCI #0 is selected from among M TCI states, TCI #0 may be arranged in TCI #0'. For example, the maximum value of value K for the base station and the terminal supporting the rel-15 may be configured to be 8 and the maximum value of value K for the base station and the terminal supporting the rel-16 may also be configured to be 8. When the maximum value is configured to be 8, the base station may indicate a selection of a beam for a PDSCH to the terminal through a DCI-based beam selection operation in one CORESET. The selection of the beam may be determined by identification of TCI field information 10-40 in DCI, from among the maximum eight beams. TCI field #1 illustrated in FIG. 10 may be selected to have a value of 0 to 7. For example, when the TCI field in the DCI is indicated by 000, it may be determined that TCI #0' (TCI #I=TCI #0') is indicated from among TCI #0', TCI #1', TCI #2', TCI #3', TCI #4', TCI #5', TCI #6', and TCI #7'. It is described in the above embodiment that each of the maximum values is configured to be 8 (K=8), but the maximum value may be configured to be a value smaller than 8. It is described in the above embodiment that the maximum value of the rel-15 MAC CE is identical to the maximum value of the rel-16 MAC CE, but different maximum values may be configured.

TABLE 14

| Definitions for parameters | Per | M | FDD-TDD DIFF | FR1 FR2 DIFF |
|---|---|---|---|---|
| tci-StatePDSCH Defines support of TCI-States for PDSCH. The capability signalling comprises the following parameters: maxNumberConfiguredTCIstatesPerCC indicates the maximum number of configured TCI-states per CC for PDSCH. For FR2, the UE is mandated to set the value to 64 128. For FR1, the UE is mandatedto set these values to the maximum number of allowed SSBs in the supported band; maxNumberActiveTCI-PerBWP indicates the maximum number of activated TCI-states per BWP per CC, including control and data. If a UE reports X active TCI state(s), it is not expected that more than X active QCL type D assumption(s) for any PDSCH and any CORESETs for a given BWP of a serving cell become active for the UE. Note the UE is required to track only the active TCI states. | Band | Yes | No | No |

In another example, when the number of TCI states extends proportional to the number of base stations/TRPs operated for C-JT/NC-JT, in the case of the operation in two TRPs, the maximum value of value K for the base station and the terminal supporting the rel-16 may be configured to be 16. When the maximum value is configured to be 16, the base station may indicate a selection of one or more beams for a PDSCH to the terminal through a DCI-based beam selection operation in one CORESET. #I selected and indicated by the base station may be a value of 0 to 15 when K is 16. It is described in the above embodiment that each of the maximum values is configured to be 16 (K=16), but the maximum value may be configured to be a value smaller than 16.

[Table 15] shows a high-layer signaling structure of a TCI state and quasi-co-location (QCL) information. Referring to [Table 15], one TCI state includes a maximum of two QCL types (qcl-Type1 and qcl-Type2) and one QCL type is connected to QCL-Info configured to be one of type A, type B, type C and type D. In this case, types of large-scale parameter values which may be referred from a reference RS by a target RS according to the QCL type are as follows:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter} (e.g., reception beam-related information).

Figure 15:
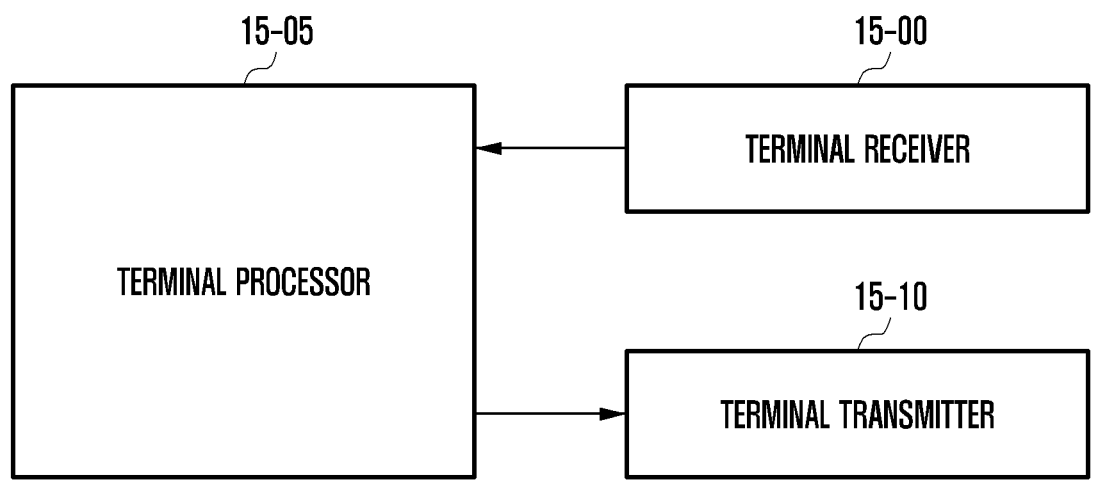
FIG. 15 is a block diagram illustrating an example structure of a terminal in a wireless communication system according to an embodiment.

In FIG. 15, the QCL-Info connected to qcl-Type1 may be configured to be one of QCL-TypeA, QCL-TypeB, and QCL-TypeC. When qcl-Type2 is configured, the QCL-Info connected thereto is configured to be QCL-TypeD.

TABLE 15

```
TCI-State :: =                      SEQUENCE {
   tci-StateId                         TCI-StateId,
   qcl-Type1                           QCL-Info,
   qcl-Type2                           QCL-Info
OPTIONAL,           -- Need R
   ...
}
QCL-Inc :: =                        SEQUENCE {
   cell                                ServCellIndex
OPTIONAL,           -- Need R
   bwp-Id                              BWP-Id
OPTIONAL, -- Cond CSI-RS-Indicated
   referenceSignal                     CHOICE {
      csi-rs                              NZP-CSI-RS-ResourceId,
      ssb                                 SSB-Index
   },
qcl-Type                            ENUMERATED {typeA, typeB, typeC, typeD},
   ...
}
TCI-StateId :: =                    Integer (0..maxNrofTCI-States-1)
```

[Table 16] shows the properties of UE capability report parameter "PDSCH beam switching (or timeDurationForQCL, UE capa 2-2)" and "Max number of downlink RS resources used for QCL type-D in the active TCI states and active spatial relation info (or UE capa 2-62)". Referring to [Table 16], the terminal may report time duration required for reception beam switching from the minimum 7 symbols to the maximum 28 symbols to the base station through timeDurationForQCL with reference to 60 kHz of subcarrier spacing (SCS) or may report time duration required for reception beam switching from the minimum 14 symbols to the maximum 28 symbols to the base station through time-DurationForQCL with reference to 120 kHz of subcarrier spacing (SCS). The 60 kHz and 120 kHz SCSs may be configured only in FR2 and, according to [Table 16], timeDurationForQCL is also usable only in FR2. Further, the terminal may notify the base station, through "UE capa 2-62", of the maximum number of downlink reference signals which can be used as a reference RS for QCL type-D of the activated TCI state. For example, when "UE capa 2-62" has a value of 1, may refer, for example, to a reference RS of QCL type-D in the activated TCI state being one, and it may be interpreted that dynamic switching for QCL-type D, that is, the reception beam, may not be performed. Meanwhile, when "UE capa 2-62" has a value equal to or greater than 2, may refer, for example, to a reference RS of QCL type-D in the activated TCI state being two or more, and it may be interpreted that dynamic switching for QCL-type D, that is, the reception beam, may be performed.

TABLE 16

| 2-2 | PDSCH beam switching | 1) Time duration (definition follows clause 5.1.5 in TS 38.214), Xi, to determine and apply spatial QCL information for corresponding PDSCH reception. Time duration is defined counting from end of last symbol of PDCCH to beginning of the first symbol of PDSCH. Xi is the number of OFDM symbols, i is the index of SCS, 1 = 1, 2, corresponding to 60, 120 kHz SCS. | Applicable only to FR2 | Mandatory with capability signaling for FR2 Candidate value set for X1 is {7, 14, 28}, Candidate value set for X2, {14, 28} |
|---|---|---|---|---|
| 2-62 | Max number of downlink RS resources used for QCL type-D in the active TCI states and active spatial relation info | Max number of downlink RS resources in the active TCI states and active spatial relation info per CC | FR1/FR2 | Optional with capability signaling Candidate value set. {1, 2, 4, 8, 14} |

The rel-15-based base station may allocate data in consideration of a scheduling timing offset (t_so) from the time point at which PDCCH reception in the CORESET is completed to the time point at which a PDSCH scheduled by the PDCCH is transmitted. The scheduling timing offset (t_so) may refer, for example, to a duration from the last symbol (the next symbol) of the PDCCH for allocating the PDSCH to a symbol preceding a symbol in which a PDSCH for transmitting data in a corresponding slot indicated by k0 illustrated in FIG. 8 starts. The scheduling timing offset (t_so) may determine a start symbol of the PDSCH based on a start and length indicator (SLIV) index configured in startSymbolAndLength (0 to 127) of PDSCH-TimeDomainResourceAllocation configured in the higher layer. The application of beamforming may be different depending on the UE capability and the capability is transferred to the base station as a timeDurationForQCL value in the process of the RRC configuration with the base station. In the disclosure, the timeDurationForQCL may be referred to as time duration for applying QCL by the terminal or a QCL application time interval.

Fundamentally, the terminal may perform below operation according to a value of the scheduling timing offset (t_so) and a value of timeDurationForQCL that is based on the UE capability to be configured in the higher layer.

When tci-PresentinDCI is not configured to be "enabled" in the higher layer configuration, the terminal may identify whether a scheduling offset/scheduling timing offset between a PDCCH and a PDSCH has a value equal to or greater than a value of timeDurationForQCL reported as UE capability report, regardless of a DCI format.

When tci-PresentinDCI is configured to be "enabled" in the higher layer configuration and the terminal receives DCI format 1_1 from the base station, the terminal may assume that a TCI field exists in a corresponding DCI and may identify whether a scheduling timing offset between the PDCCH and the PDSCH has a value equal to or greater than a value of timeDurationForQCL reported as UE capability report.

When the scheduling offset/scheduling timing offset between the PDCCH and the PDSCH has a value smaller than the timeDurationForQCL, the terminal may determine a DMRS port of the received PDSCH based on a QCL parameter used in the CORESET associated with the monitored search space having the lowest CORESET ID in the latest slot.

Further, for example, when the scheduling offset/scheduling timing offset between the PDCCH and the PDSCH has a value equal to or greater than the timeDurationForQCL, the terminal applies the same QCL assumption as the CORESET used for the PDCCH transmission for a corresponding PDSCH DMRS port.

In another example, when the scheduling offset/scheduling timing offset between the PDCCH and the PDSCH has a value equal to or greater than the timeDurationForQCL, the terminal applies a QCL assumption indicated by a TCI field in a corresponding PDCCH (DCI) for a corresponding PDSCH DMRS port. Meanwhile, among TCI states configured "for all BWP" by the terminal, no TCI state is included in QCL Type-D, the terminal may acquire a QCL assumption according to a TCI state always indicated regardless of the interval between DCI and a PDSCH allocated by the DCI.

Figure 11:
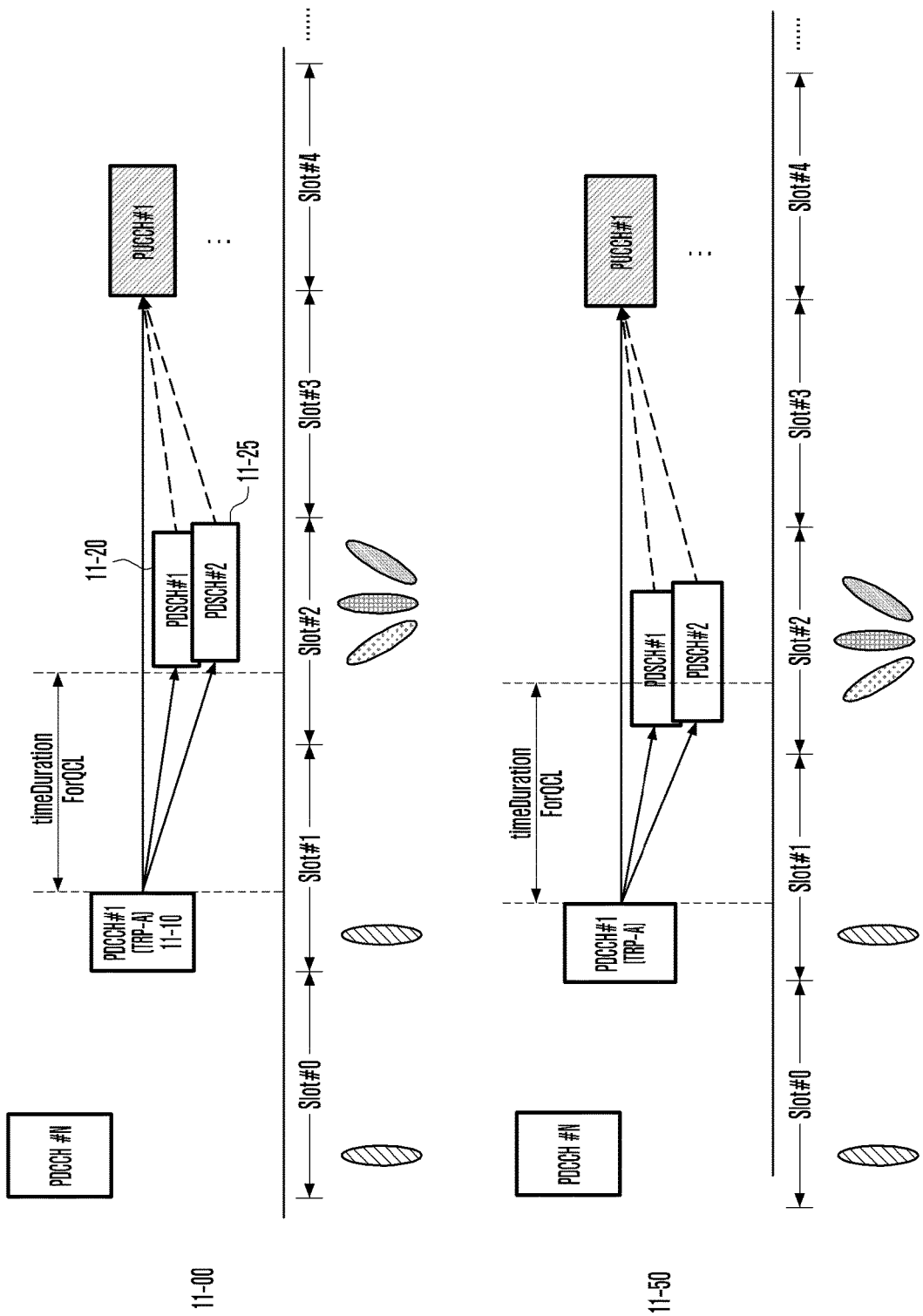
FIG. 11 is a diagram illustrating an example of cooperative communication based on a single PDCCH according to an embodiment.
Figure 12:
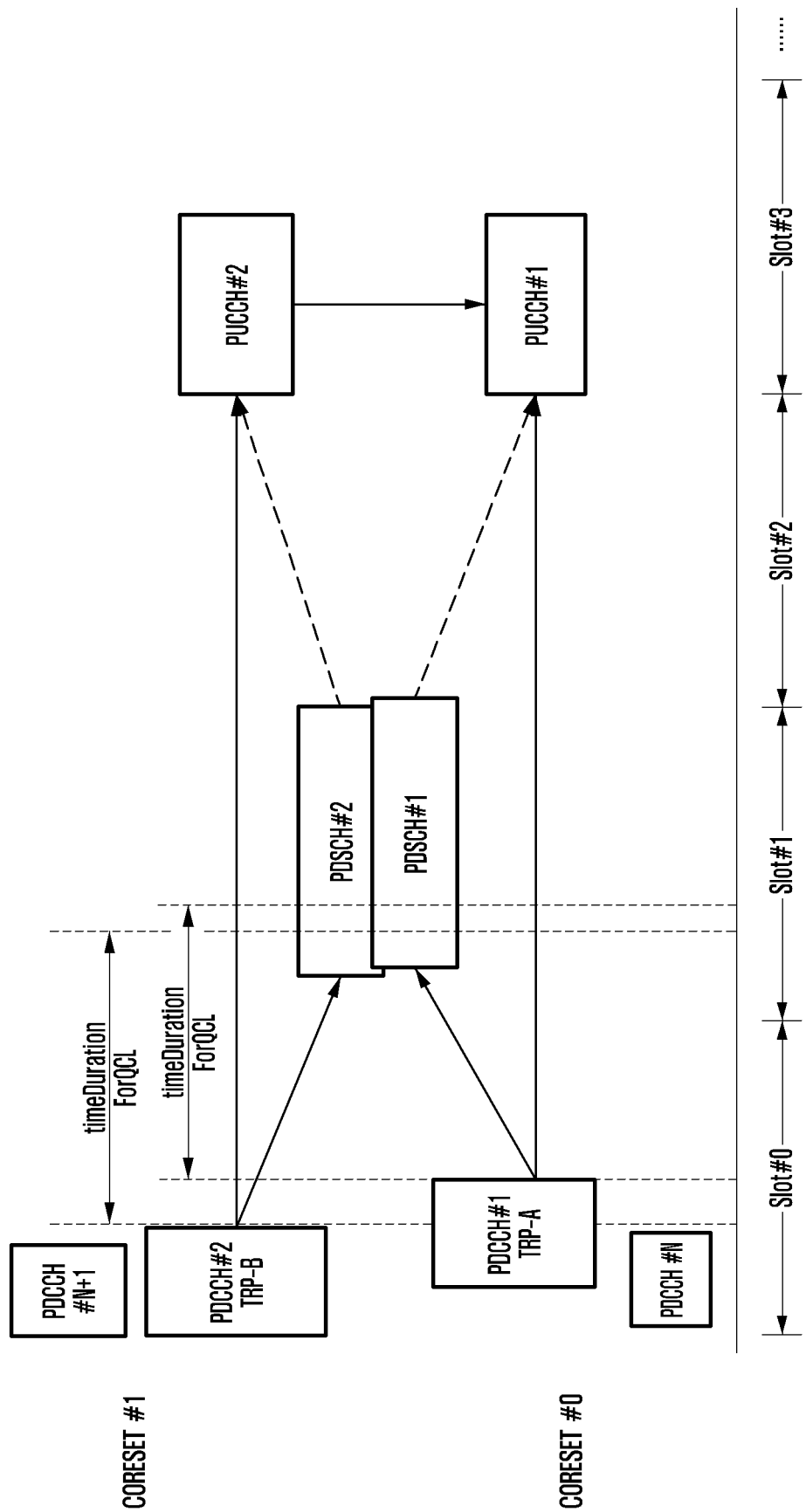
FIG. 12 is a diagram illustrating an example of cooperative communication based on multiple PDCCHs according to an embodiment.
Figure 13A:
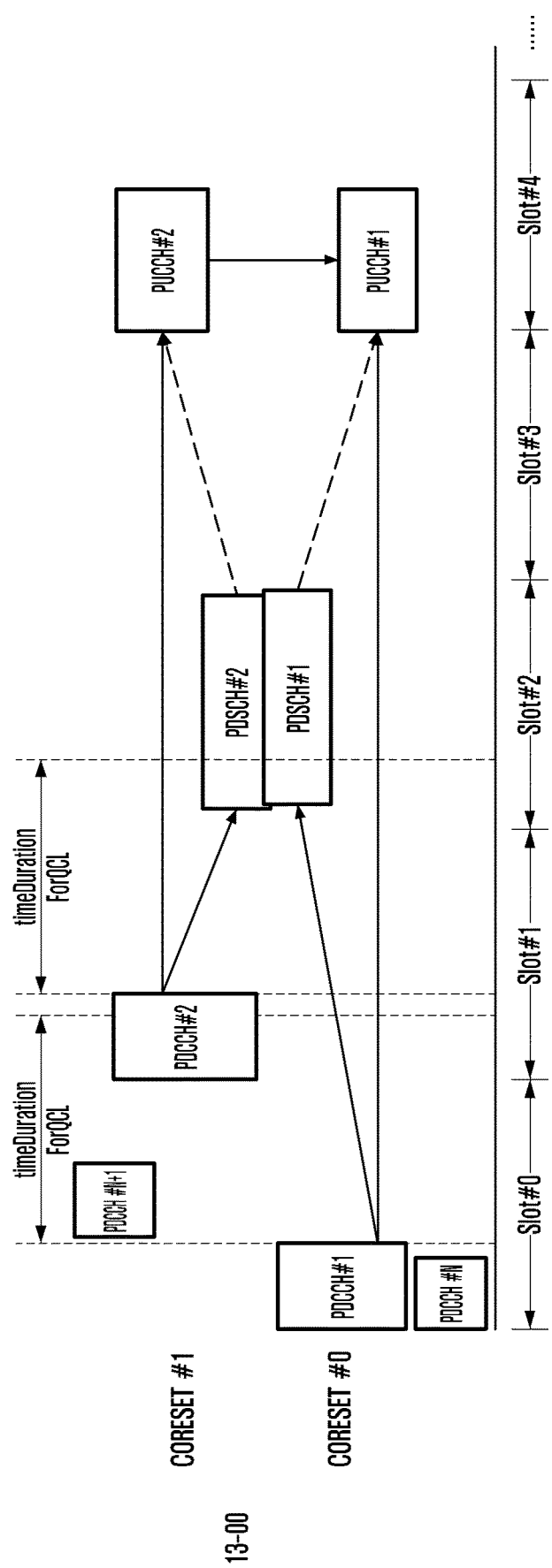
FIG. 13A is a diagram illustrating an example of cooperative communication based on multiple PDCCHs according to an embodiment.
Figure 13B:
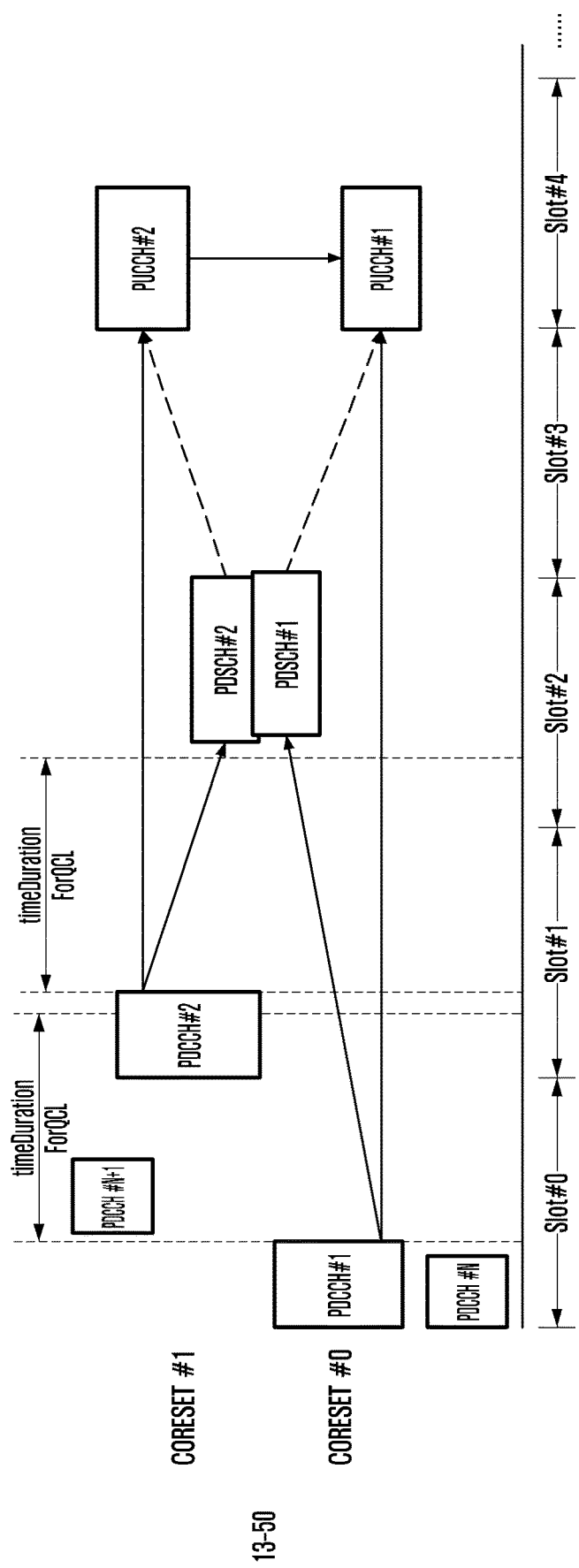
FIG. 13B is a diagram illustrating an example of cooperative communication based on multiple PDCCHs according to another embodiment.

FIG. 11 is a diagram illustrating an example structure of a PDCCH transmitted by a base station according to at least one configured CORESET and search space, FIG. 12 is a diagram illustrating an example structure of a PDCCH transmitted by a base station according to at least one configured CORESET and search space, FIG. 13A is a diagram illustrating an example structure of a PDCCH transmitted by a base station according to at least one configured CORESET and search space, and FIG. 13B is a diagram illustrating an example structure of a PDCCH transmitted by a base station according to at least one configured CORESET and search space.

FIG. 11 illustrates an embodiment of transmission of a first PDCCH by the base station in one CORESET (e.g., a first CORESET or PDCCH #1) as shown in FIG. 8, FIG. 12 illustrates an embodiment of transmission of a first PDCCH by the base station in one CORESET (e.g., a first CORESET or PDCCH #1) as shown in FIG. 8, FIG. 13A illustrates an embodiment of transmission of a first PDCCH by the base station in one CORESET (e.g., a first CORESET or PDCCH #1) as shown in FIG. 8, and FIG. 13B illustrates an embodiment of transmission of a first PDCCH by the base station in one CORESET (e.g., a first CORESET or PDCCH #1) as shown in FIG. 8. For example, the first PDCCH transmitted from TRP-A may perform scheduling for one or more PUCCH resources and two or more PDSCHs. DMRS ports of different CDM groups may be applied to each of the PDSCHs transmitted by the base station and a DMRS transmission symbol transmitted together with each of the PDSCHs may be positioned on the same symbol.

As long as there is no update by a MAC CE, the base station applies the same beam direction for beam directions (TCI-states) of the PDCCH, in a particular CORESET, transmitted by the base station for a particular terminal. In FIGS. 11, 12, 13A, and 13B, an $N^{th}$ PDCCH (PDCCH #N) transmitted by the base station/TRP A corresponds to a PDCCH in a CORESET associated with the monitored search space having the lowest CORESET ID in the latest slot. That is, unless receiving a PDCCH beam switching update message, the terminal applies the same QCL parameter, which is used when receiving the $N^{th}$ PDCCH in a CORESET associated with the monitored search space having the lowest CORESET ID in the latest slot, for the first PDCCH reception. It is described that the $N^{th}$ PDCCH is transmitted from a preceding slot of the first PDCCH according to an embodiment describing transmission from different search spaces in the same CORESET, but the embodiment does not limit the transmission from another search spaces of the same slot.

In FIGS. 11, 12, 13A, and 13B, the first PDCCH and the second PDCCH may indicate allocation of the first PDSCH and the second PDSCH for NC-JT, wherein the beamforming directions of the PDSCHs may be switched depending on the beamforming information configured in the higher layer and TCI information, antenna port information, or RNTI information of DCI in the first PDCCH or the second PDCCH. The terminal may identify the beamforming direction switched by the base station based on the received beamforming information and DCI information.

For example, in FIG. 11, the beamforming direction of the first PDCCH may be different from the beam directions of the first PDSCH and the second PDSCH for NC-JT. In another example, the beamforming direction of the first PDCCH may be the same as the beamforming directions of the first PDSCH and the second PDSCH for NC-JT. In another example, the base station may configure the beamforming directions of the first PDSCH and the second PDSCH to be different from each other in consideration of the spatial beamforming gain.

FIG. 11 illustrates an operation of the base station and the terminal according to a relationship between timeDurationForQCL and scheduling timing offset including the number of symbols and the duration between the last symbol of the first PDCCH and the start symbols of the PDSCHs.

In the disclosure the scheduling timing offset may refer, for example, to the number of symbols between the last symbol of the PDCCH and the start symbol of the PDSCH corresponding to the PDCCH, but embodiments of the disclosure are not limited thereto and the scheduling timing offset may be defined variously as a symbol unit or a slot unit having a predetermined value.

For example, the base station may not support NC-JT-based transmission in which the base station performs scheduling for the terminal using a single PDCCH, wherein tci-PresentinDCI is not configured to be "enabled" for the terminal. That is, the base station may allocate one PDSCH in one PDCCH for the terminal for which tci-PresentinDCI is not configured to be "enabled". When the base station allocates two or more PDSCHs to a particular terminal by performing scheduling using a single PDCCH, NC-JT-based transmission may be performed only in the case where tci-PresentinDCI is configured to be "enabled" for the terminal. However, the NC-JT-based transmission may be performed when scheduled using the multi-PDCCH, and description related thereto will be added in an example discussed below.

In another example, the base station may indicate NC-JT-based transmission in which the base station performs scheduling for the terminal using a single PDCCH based on the antenna port information in the single PDCCH, wherein the tci-PresentinDCI is not configured to be "enabled" for the terminal. For example, the base station may indicate information related to DMRSs mapped to different CDM groups, among the antenna port information to the terminal so as to notify of information related to multiple PDSCHs to be transmitted by the base station.

The base station may support NC-JT-based transmission by performing scheduling for the terminal, using DCI format 1_1 in a single PDCCH, wherein tci-PresentinDCI is configured to be "enabled" for the terminal. Further, in the NC-JT-based transmission, the base station may perform data transmission to the terminal in consideration of the scheduling timing offset (t_so) between the single PDCCH and multiple PDSCHs.

11-00 in FIG. 11 shows the case in which a value of t_so scheduled by the base station is 14 or larger. When the calculated value of the t_so is 14 or larger, the base station may perform determination and operation using at least one method among methods illustrated below.

For example, the base station may transmit the first PDCCH (DCI format 1_1) and transmit the first PDSCH 11-20 and the second PDSCH 11-25 allocated by the first PDCCH 11-10 for NC-JT-based transmission to a particular terminal for which tci-PresentinDCI is configured to be "enabled". In this case, the base station may transmit both the first PDSCH 11-20 and the second PDSCH 11-25 based on the scheduling algorithm of the base station and without considering timeDurationForQCL of the terminal. For example, the base station may indicate the beamforming directions in which the PDSCHs are transmitted, using the antenna port information and the TCI information in the DCI of the first PDCCH 11-10. The capability of the terminal is not considered at the time of scheduling.

In another example, when the base station determines based on the timeDurationForQCL information of the terminal and the indicated TCI state-related information of the first PDSCH and the second PDSCH that the terminal may receive at least one PDSCH, for the NC-JT-based transmission for a particular terminal, the base station may transmit the first PDCCH and the first PDSCH and the second PDSCH allocated by the first PDCCH to the terminal.

In another example, when the base station determines based on the timeDurationForQCL information of the terminal and the indicated TCI state-related information of the first PDSCH and the second PDSCH that the terminal may receive the two PDSCHs, for the NC-JT-based transmission for a particular terminal, the base station may transmit the first PDCCH and the first PDSCH and the second PDSCH allocated by the first PDCCH to the terminal.

For example, when the tci-PresentinDCI is not configured to be "enabled", the terminal may not expect NC-JT-based transmission. That is, when tci-PresentinDCI is not configured to be "enabled" or DCI format 1_0 is received, the terminal may consider that only one PDSCH corresponding one PDCCH is transmitted. For example, the terminal may determine that the beamforming direction of the first PDCCH and the beamforming direction of the PDSCH indicated by the first PDCCH are identical.

In another example, when the tci-PresentinDCI is not configured to be "enabled", the terminal may determine whether NC-JT is supported, based on the antenna port information in the DCI. That is, the antenna port information may include information on whether the base station transmits a single PDSCH or multiple PDSCHs. For example, the terminal may determine that the beamforming direction of the first PDCCH and at least one of the beamforming directions of the first PDSCH and the second PDSCH indicated by the first PDCCH are identical. Alternatively, the terminal may determine the TCI state that the beamforming direction of the first PDCCH and the beamforming directions of the first PDSCH and the second PDSCH indicated by the first PDCCH are configured as a default.

When receiving a message on the tci-PresentinDCI configured to be "enabled" and DCI format 1_1 of the first PDCCH from the base station, the terminal may calculate scheduling timing offset (t_so) and compare the calculated scheduling timing offset (t_so) with the UE capability parameter timeDurationForQCL (e.g., S14) reported to the base station.

11-00 in FIG. 11 shows the case in which a value of t_so calculated by the terminal is 14 or larger. When the value of the t_so is 14 or larger, the terminal may perform determination and operation using at least one method among methods illustrated below.

For example, the terminal may assume that a TCI field exists in corresponding DCI and may apply each of QCL parameters (sets) of TCI states indicating the beamforming direction for at least one PDSCH, indicated by a codepoint of TCI.

In another example, when the information indicated by the codepoint of the TCI includes one TCI state, the terminal may assume that TCI states for one of two PDSCHs are identical to TCI of the PDCCH. The terminal may apply the QCL parameter for the first PDSCH and the second PDSCH based on the information of the configured TCI field and may receive data.

11-50 in FIG. 11 illustrates the case in which t_so between the PDCCH and the PDSCHs transmitted by the base station has a value smaller than 14. When t_so has the value smaller than 14, the base station may perform determination and operation using at least one method among methods illustrated below.

When the tci-PresentinDCI is not configured to be "enabled" by the base station, the base station may operate using the same method of example embodiments discussed herein.

An operation in the case in which the tci-PresentinDCI configured to be "enabled" by the base station and DCI format 1_1 of the PDCCH is transmitted is described.

For example, for the NC-JT-based transmission for a particular terminal, the base station may transmit the first PDCCH and both the first PDSCH and the second PDSCH allocated by the first PDCCH, based on the scheduling algorithm of the base station and without considering timeDurationForQCL of the terminal. For example, the base station may indicate the beamforming directions in which the PDSCHs are transmitted using the antenna port information and the TCI information in the DCI transmitted through the first PDCCH. The capability of the terminal is not considered at the time of scheduling. In another example, with respect to the transmission of the first PDCCH and the transmission of the first PDSCH and the second PDSCH allocated by the first PDCCH, for the NC-JT-based transmission for a particular terminal, when the base station determines based on the timeDurationForQCL information of the terminal and the indicated TCI state-related information of the first PDSCH and the second PDSCH that the terminal may not receive at least one PDSCH, the base station may transmit a receivable PDSCH (e.g., PDSCH #1) only to the terminal. In another example, with respect to the transmission of the first PDCCH and the transmission of the first PDSCH and the second PDSCH allocated by the first PDCCH, for the NC-JT-based transmission for a particular terminal, when the base station determines based on the timeDurationForQCL information of the terminal and the indicated TCI state-related information of the first PDSCH and the second PDSCH that the terminal may not receive at least one of PDSCH, the base station may transmit at least one of the first PDSCH and the second PDSCH based on the TCI state (e.g., the TCI state used for receiving PDCCH #1 or PDCCH #N) receivable by the terminal and in consideration of the timeDurationForQCL of the terminal. In another example, with respect to the transmission of the first PDCCH and the transmission of the first PDSCH and the second PDSCH allocated by the first PDCCH, for the NC-JT-based transmission for a particular terminal, when the base station determines that the terminal may not receive at least one PDSCH in consideration of only the timeDurationForQCL of the terminal, the base station may not perform any PDSCH (e.g., PDSCH #1 and PDSCH #2) transmission which is supposed to be performed by the PDCCH.

When receiving a message on the tci-PresentinDCI configured to be "enabled" and DCI format 1_1 of the first PDCCH from the base station, the terminal may calculate scheduling timing offset (t_so) and compare the calculated scheduling timing offset (t_so) with the UE capability parameter timeDurationForQCL (e.g., S14) reported to the base station.

11-50 in FIG. 11 illustrates the case in which t_so calculated by the terminal has a value smaller than 14. When t_so has the value smaller than 14, the terminal may perform determination and operation using at least one method among methods illustrated below.

When the scheduling timing offset (t_so) calculated by the terminal has a value smaller than that of the UE capability parameter timeDurationForQCL (e.g., S14) reported to the base station, the terminal may not expect the NC-JT-based transmission of the base station.

For example, when the timeDurationForQCL required to apply a QCL parameter related to the TCI state indicating the beamforming direction for the PDSCH fails to be satisfied, the terminal may skip all PDSCH reception operations indicated by the PDCCH. In another example, when the timeDurationForQCL required to apply a QCL parameter related to the TCI state indicating the beamforming direction for the PDSCH fails to be satisfied, the terminal may apply the same QCL parameter used to receive the $N^{th}$ PDCCH in the CORESET associated with the monitored search space having the lowest CORESET ID in the latest slot, for the reception of the first PDSCH or the second PDSCH. For example, the terminal may apply the QCL parameter for both the first PDSCH and the second PDSCH and may perform decoding. Consequently, when the base station performs NC-JT for which different beamforming directions are applied, it is expected that the terminal may succeed in selectively receiving one PDSCH only among the two PDSCHs.

When the scheduling timing offset (t_so) calculated by the terminal has a value smaller than that of the UE capability parameter timeDurationForQCL (e.g., S14) reported to the base station, the terminal may expect the single transmission-based transmission of the base station.

For example, when the timeDurationForQCL required to apply a QCL parameter related to the TCI state indicating the beamforming direction for the PDSCH fails to be satisfied, the terminal may use the QCL parameter used to receive the $N^{th}$ PDCCH in the CORESET associated with the monitored search space having the lowest CORESET ID in the latest slot. For example, the terminal may receive data from the PDSCH (e.g., the first PDSCH/the second PDSCH) allocated in the lowest/highest resource RB among the first PDSCH and the second PDSCH and use the above-mentioned QCL parameter. In another example, when the timeDurationForQCL required to apply a QCL parameter related to the TCI state indicating the beamforming direction for the PDSCH fails to be satisfied, the terminal may apply, for both the first PDSCH and the second PDSCH, the QCL parameter used to receive the $N^{th}$ PDCCH in the CORESET associated with the monitored search space having the lowest CORESET ID in the latest slot. Further, the DMRS port configuration for the reception of the first PDSCH and the second PDSCH may be received based on the antenna port information in the DCI.

In the above embodiments, it is expected that one default QCL is configured for the terminal in the NC-JT based on the single PDCCH in one CORESET.

Further, it is expected that two or more default QCLs are configured for the terminal in NC-JT based on the single PDCCH in one CORESET. The configuration of two or more default QCLs may refer, for example, to the terminal applying the QCL parameter for two PDSCHs (e.g., the first PDSCH and the second PDSCH) based on the information preconfigured by the base station. The QCL parameter to be applied may be implicitly or explicitly configured according to DCI information indicated to the terminal (e.g., antenna port information and TCI information) and MAC CE or RRC information.

For example, when configuring two or more default QCLs for each CORESET or each PDCCH-config, the base station may configure the beamforming direction of each of TRPs based on the two default QCLs to be the same as the beamforming direction at the terminal side in which a reception operation is performed. Alternatively, a TCI state of each of the TRPs may be configured on the assumption that the TRPs perform the same beamforming at the terminal side. The terminal determines that the TCI states are identical based on the MAC CE or RRC information implicitly or explicitly configured by the base station and may perform the reception operation based thereon. The TCI states may be identical to or different from each other in consideration of the channel and the position of the TRP. That is, the terminal may perform reception beamforming in the same direction by applying the QCL parameter to two PDSCHs (e.g., the first PDSCH and the second PDSCH).

In another example, when configuring two or more default QCLs for each CORESET or each PDCCH-config, the base station may configure that the two or more default QCLs are identical at the base station side. That is, two default QCLs are explicitly configured, but may be configured to indicate the same beamforming direction. The terminal may identify the same configuration of the TCI states configured by the base station and perform the same beamforming. Alternatively, the terminal may assume that the TCI states for default QCLs configured by the base station are identical to each other and may perform the reception operation based on one TCI state. That is, the terminal may apply the same QCL parameter configured for two PDSCHs (e.g., the first PDSCH and the second PDSCH) and may perform the reception beamforming in the same direction.

The base station may sequentially configure two or more default QCLs for each CORESET or each PDCCH-config. Alternatively, in some cases, two or more default QCLs may not be completely configured, but only one default QCL may be configured.

For example, the base station may configure the default QCL for the first PDSCH and may or may not configure the default QCL for the second PDSCH later. When only the default QCL for the first PDSCH configured in one ServingCell, PDCCH-config, or CORESET (group) for each TRP is configured at the time point at which the default QCL for the second PDSCH is not configured, the terminal may determine that the default QCL for the second PDSCH is identical to that of the first PDSCH. Alternatively, the terminal may determine that the default QCL for the second PDSCH is unnecessary and may determine that the default QCL for the second PDSCH fails to be scheduled within the scheduling timing offset. Alternatively, the terminal may determine that the transmission of the second PDSCH is not performed. In other words, at the time point at which the base station does not configure two or more default QCLs, the terminal may assume that two or more PDSCH are not transmitted within one slot in the single-DCI-based multi-TRP and may determine that two or more PDSCHs are transmitted within one slot in the multi-TRP after two or more default QCLs are configured.

In FIG. 12, an embodiment of transmitting a first PDCCH in one CORESET (e.g., CORESET #0 or PDCCH #1) and additionally transmitting a second PDCCH in another CORESET (e.g., CORESET #1 or PDCCH #2) is described.

For example, the first PDCCH transmitted from TRP-A may schedule one or more PUCCH resources (the first PDCCH) and one or more PDSCHs (the first PDSCH) and the second PDCCH transmitted from TRP-B may schedule one or more PUCCH resources (the second PUCCH) and one or more PDSCHs (the second PDSCH). DMRS ports of different CDM groups may be applied to each of the PDSCHs transmitted by the base station and a DMRS transmission symbol transmitted together with each of the PDSCHs may be positioned on the same symbol. It is assumed that the PDSCHs are transmitted in the same symbol, but the disclosure is not intended to limit the transmission from the same symbol only.

Further, the multiple CORESETs may be divided and configured for the multi-DCI-based NC-JT of the base station. Alternatively, the multiple CORESETs may be configured in the set format such as a CORESET group and may be indicated based on higher-layer or L1/L2 signaling for the terminal supporting the NC-JT.

For example, for the multi-DCI-based NC-JT, the base station may configure one CORESET group including one or more CORESETs for a particular terminal. For example, the base station may configure four CORESETs in one CORESET group for the particular terminal. Accordingly, the terminal may monitor the configured CORSETs and receive two PDCCHs and may receive the allocated PDSCHs from the received PDCCH. As shown in FIG. 12, one CORESET group (e.g., CORESET group #0) may be configured for a particular terminal by the base station and the terminal may monitor CORESET #0 and CORESET #1 for NC-JT, among the maximum five CORESETs (e.g., CORESET #0 to CORESET #4) included in the CORESET group. The CORESET to be monitored by the terminal in the CORESET group may be configured by the base station, may be determined according to the configuration of the terminal, or may be determined in a predetermined way. This may be applied to other embodiments.

In another example, for the multi-DCI-based NC-JT, the base station may configure two or more CORESET groups including one or more CORESETs for a particular terminal. For example, the base station may configure two CORESET groups for a particular terminal and may configure or indicate CORESET(s) in one CORESET group or in each of the CORESET groups among the configured groups. Accordingly, the terminal may monitor the configured CORESET(s) and receive two PDCCHs and may receive PDSCHs allocated by the received PDCCH. As shown in FIG. 12, two CORESET groups (e.g., CORESET group #0 and CORESET group #1) may be configured for a particular terminal by the base station and the terminal may monitor CORESET #0 in CORESET group #0 and CORESET #1 in CORESET group #1 for NC-JT, among the CORESETs in the CORESET groups. The CORESET to be monitored by the terminal in the CORESET group may be configured by the base station, may be determined according to the configuration of the terminal, or may be determined in a predetermined way.

CORESET #0 may include the first PDCCH and the $N^{th}$ PDCCH and CORESET #1 may include the second PDCCH and the $N+1^{th}$ PDCCH. The CORESETs configured for each CORESET group may be different (e.g., CORESET group #0 includes CORESET #0 and #2 and CORESET group #1 includes CORESET #1, #3, and #5) and the sum of the number of CORESETs configured in all CORESET groups may be within the maximum CORESET number which may be configured for the terminal, e.g., which are reported as a UE capability. In the above embodiment, the maximum CORESET number may be 5 or less.

As long as there is no update by a MAC CE, the base station applies the same beam direction for beam directions (TCI-states) of the PDCCH, in a particular CORESET, transmitted by the base station for a particular terminal.

FIG. 12 illustrates that the $N^{th}$ PDCCH (PDCCH #N)/the $N+1^{th}$ PDCCH (PDCCH #N+1) transmitted from TRP-A/TRP-B is each of the PDCCHs in each CORESET associated with the monitored search space having the lowest CORESET ID in the latest slot. That is, when the terminal receives no PDCCH beam switching update message, the same QCL parameter used to receive the $N^{th}$ PDCCH/the $N+1^{th}$ PDCCH in the CORESET associated with the monitored search space having the lowest CORESET ID in the latest slot may be applied for the reception of the first PDCCH/the second PDCCH.

It is described that the $N^{th}$ PDCCH (PDCCH #N)/the $N+1^{th}$ PDCCH (PDCCH #N+1) is transmitted from the same slot of the first PDCCH/the second PDCCH according to an embodiment describing transmission from different search spaces in the same CORESET, but the embodiment does not limit transmission from another search spaces of a preceding slot.

The first PDCCH and the second PDCCH may indicate allocation of the first PDSCH and the second PDSCH for NC-JT, respectively, wherein the beamforming directions of the PDSCHs may be switched depending on the beamforming information configured in the higher layer and TCI information, antenna port information, or RNTI information of DCI in the first PDCCH or the second PDCCH. The terminal may identify the beamforming direction switched by the base station based on the received beamforming information and DCI information.

For example, the beamforming direction of the first PDCCH may be different from the beamforming direction of the first PDSCH for NC-JT and the beamforming direction of the second PDCCH may be different from the beamforming direction of the second PDSCH for NC-JT.

In another example, the beamforming direction of the first PDCCH may be the same as the beamforming direction of the first PDSCH for NC-JT and the beamforming direction of the second PDCCH may be the same as the beamforming direction of the second PDSCH for NC-JT.

In another example, the base station may configure the beam directions of the first PDSCH and the second PDSCH to be different from each other in consideration of the spatial beamforming gain.

FIG. 12 illustrates an operation of the base station and the terminal according to a relationship between timeDurationForQCL and a scheduling timing offset corresponding the duration between the last symbol of the first PDCCH and the start symbol of the first PDSCH received by the terminal and to a relationship between timeDurationForQCL and a scheduling timing offset corresponding the duration between the last symbol of the second PDCCH and the start symbol of the second PDSCH received by the terminal, FIG. 13A illustrates an operation of the base station and the terminal according to a relationship between timeDurationForQCL and a scheduling timing offset corresponding the duration between the last symbol of the first PDCCH and the start symbol of the first PDSCH received by the terminal and to a relationship between timeDurationForQCL and a scheduling timing offset corresponding the duration between the last symbol of the second PDCCH and the start symbol of the second PDSCH received by the terminal, and FIG. 13 B illustrates an operation of the base station and the terminal according to a relationship between timeDurationForQCL and a scheduling timing offset corresponding the duration between the last symbol of the first PDCCH and the start symbol of the first PDSCH received by the terminal and to a relationship between timeDurationForQCL and a scheduling timing offset corresponding the duration between the last symbol of the second PDCCH and the start symbol of the second PDSCH received by the terminal.

When tci-PresentinDCI is not configured to be "enabled" for the terminal by the base station, for the NC-JT-based transmission, the base station may perform scheduling without considering the scheduling timing offset (t_so) and the time DurationForQCL reported as the UE capacity report.

For example, when tci-PresentinDCI is configured to be "enabled" for the terminal by the base station, for the NC-JT-based transmission, the base station may perform scheduling without considering the scheduling timing offset (t_so) and the time DurationForQCL reported as the UE capacity report. The base station may determine whether to switch the first PDSCH and second PDSCH NC-JT-based transmission beam without considering the UE capacity. Accordingly, the base station may transmit the PDSCHs based on the TCI field information of the PDCCH for allocating the first PDSCH and the second PDSCH. In another example, when tci-PresentinDCI is configured to be "enabled" for a particular terminal by the base station, for the NC-JT-based transmission, the base station may perform scheduling in consideration of the scheduling timing offset (t_so) and the time DurationForQCL reported as the UE capacity report. The base station may determine the beam directions of the PDSCHs according to whether to switch the first PDSCH and second PDSCH NC-JT-based transmission beam.

For example, as shown in FIG. 12, the case in which the base station configures, among CORESET group #0 and CORESET group #1 (e.g., CORSET group #0 includes CORSET #0 and #2 and CORESET group #1 includes CORSET #1, #3, and #5), CORESET #0 in CORSET group #0 and CORESET #1 in CORSET group #1, for the terminal for NC-JT and the beam switching for the first PDSCH and the second PDSCH among PDSCHs to be transmitted in association with the PDCCHs in the CORESETs occurs is described. The base station may perform, for a particular terminal, at least one of an operation of comparing the timeDurationForQCL and the first scheduling timing offset corresponding to the duration between the first PDCCH and the first PDSCH, during which beam switching of the PDSCH occurs, or an operation of comparing the timeDurationForQCL and the second scheduling timing offset corresponding to the duration between the second PDCCH and the second PDSCH. Accordingly, when each of the first scheduling timing offset and the second scheduling timing offset during which beam switching occurs has a value smaller than that of the timeDurationForQCL, the base station may operate as below.

According to an embodiment, the same QCL parameter used to transmit the $N^{th}$ PDCCH in the CORESET associated with the monitored search space having the lowest CORESET ID (e.g., CORESET #0 and CORESET #1) in the latest slot in each CORESET group (e.g., CORESET group #0 and CORESET group #1) may be applied for the transmission of the first PDSCH and the same QCL parameter used to transmit the $N+1^{th}$ PDCCH may be applied for the transmission of the second PDSCH.

For example, in FIG. 12, when PDSCH #1 is scheduled from CORESET group #0, the QCL parameter used for PDCCH #N corresponding to the monitored search space for the lowest CORESET ID in the latest slot in a corresponding CORESET group is used for the transmission of PDSCH #1. Meanwhile, when PDSCH #2 is scheduled from CORESET group #1, similar to the description above, the QCL parameter used for PDCCH #N+1 is used for the transmission of PDSCH #2. That is, the base station may set two CORESET groups for NC-JT and CORESET groups may correspond to TRPs, respectively. The QCL assumption for each PDSCH may be referenced by the corresponding lowest CORESET-ID in the CORESET group.

According to another embodiment, the same QCL parameter used to transmit the $N^{th}$ PDCCH in the CORESET associated with the monitored search space having the lowest CORESET ID (e.g., CORESET #0) in the latest slot in the lowest CORESET group (e.g., CORESET group #0) may be applied for transmission of each of the first PDSCH and the second PDSCH.

According to another embodiment, the QCL parameter used to transmit the $N^{th}$ PDCCH in the CORESET associated with the monitored search space having the lowest CORESET ID (e.g., CORESET #0) in the latest slot in the lowest CORESET group (e.g., CORESET group #0) may be applied for the transmission of the first PDSCH and the transmission for the second PDSCH may be dropped or may not be performed. That is, according to the lowest CORESET ID, the transmission of the PDSCH may be prioritized.

In another example, the case in which the base station may configure CORESETs (CORESET #0 and CORESET #1 of FIG. 12) for NC-JT in CORSET group #0 (e.g., CORESET group #0 includes CORESET #0 and CORESET #1) and the beam switching for the first PDSCH and the second PDSCH among PDSCHs to be transmitted in association with the PDCCHs in the CORESETs occurs is described. The base station may perform, for a particular terminal, an operation of comparing the timeDurationForQCL and the first scheduling timing offset corresponding to the duration between the first PDCCH and the first PDSCH, during which beam switching of the PDSCH occurs, and comparing the timeDurationForQCL and the second scheduling timing offset corresponding to the duration between the second PDCCH and the second PDSCH. Accordingly, when the first scheduling timing offset or the second scheduling timing offset during which beam switching of the PDSCH occurs has a value smaller than that of the timeDurationForQCL, the base station may operate as described in various embodiments below.

According to an embodiment, the base station may apply the same QCL parameter used to transmit the $N^{th}$ PDCCH in the CORESET associated with the monitored search space based on the information on the lowest CORESET ID (e.g., CORESET #0) or the second lowest CORESET ID (e.g., CORESET #1) in the latest slot in the CORESET group (e.g., CORESET group #0) in which beam switching occurs, for the transmission of the first PDSCH or may apply the same QCL used to transmit the $N+1^{th}$ PDCCH for the transmission of the second PDSDH.

According to another embodiment, the base station may apply the same QCL parameter used to transmit the $N^{th}$ PDCCH in the CORESET associated with the monitored search space based on information on the lowest CORESET ID (e.g., CORESET #0) in the latest slot in the CORESET group (e.g., CORESET group #0) in which the beam switching occurs, for the transmission of each of the first PDSCH and the second PDSCH in which the beam switching occurs.

According to another embodiment, the base station may apply, for the transmission of the first PDSCH, the QCL parameter used to transmit the $N^{th}$ PDCCH in the CORESET associated with the monitored search space based on information on the lowest CORESET ID (e.g., CORESET #0) in the latest slot in the CORESET group (e.g., CORESET group #0) in which the beam switching occurs and may drop or may not perform the transmission of the second PDSCH. That is, according to the lowest CORESET ID, the transmission of the PDSCH may be prioritized.

Further, in the embodiment described above, the CORESET group (e.g., CORESET group #0 includes CORESET #0 and CORESET #2) exists. However, in some cases, only the CORESET may exist without the concept or configuration of the CORESET group. For the latter cases, solutions may be apparent from an analysis of the above description of the CORESET ID, differing in view of the CORESET group excluded from the above description.

The above-described embodiments describe the case of having the lowest CORESET/CORESET group ID, but may extend the description for the case of having the highest CORESET/CORESET group ID and the like.

In another example, when the beam switching occurs in at least one of PDSCHs to be transmitted, the base station may perform, for a particular terminal, at least one of an operation of comparing the timeDurationForQCL and the first scheduling timing offset corresponding to the duration between the first PDCCH and the first PDSCH, or an operation of comparing the timeDurationForQCL and the second scheduling timing offset corresponding to the duration between the second PDCCH and the second PDSCH. When both the first and second scheduling timing offsets have a value smaller than the timeDurationForQCL and the timeDurationForQCL has a particular value (e.g., S7), the base station may select one of the QCL parameters used to transmit the $N^{th}$ PDCCH and the $N+1^{th}$ PDCCH and commonly apply the selected QCL parameter for the beam directions of the first PDSCH and the second PDSCH. For example, the selection scheme may include a scheme of selecting the lowest/highest CORESET ID, selecting the PDCCH index allocated in the latest search space, or selecting the longest time gap between the PDSCH transmission and the PUCCH transmission of transmitting ACK/NACK of the PDSCH. According the implementation, multiple PDSCHs may be transmitted from TRP-A or TRP-B.

When receiving a message on the tci-PresentinDCI configured to be "enabled" and DCI format 1_1 of the first PDCCH from the base station, the terminal may calculate scheduling timing offset (t_so) and compare the calculated scheduling timing offset (t_so) with the UE capability parameter timeDurationForQCL (e.g., S14) reported to the base station. FIG. 12 illustrates the case in which both the calculated value of t_so1 and the value of t_so2 are smaller than 14. When the calculated value of the t_so is smaller than 14, the terminal may perform determination and operation using at least one method among methods illustrated below.

In an example, in the case in which the tci-PresentinDCI is configured to be "enabled" by the base station and the terminal receives DCI format 1_1 of the first PDCCH or the second PDCCH, when both calculated values of the scheduling timing offsets (t_so) are smaller than the UE capacity parameter timeDurationForQCL (e.g., S14) reported to the base station, the terminal may not expect the NC-JT-based transmission of the base station. For example, when the timeDurationForQCL required to apply the QCL parameter related to the TCI state indicating the beamforming direction for the PDSCH fails to be satisfied, the terminal may skip all PDSCH reception operations indicated by the PDCCH.

In another example, both timeDurationForQCLs required to apply the QCL parameters related to the TCI states indicating the beamforming directions for the first PDSCH and the second PDSCH fail to be satisfied, the terminal may operate according an example embodiment below. Multiple CORESET groups may be configured for the terminal, and in the embodiment, it is assumed that the first PDSCH is allocated in association with the PDCCH in the CORESET in CORESET group #0 and the second PDSCH is allocated in association with the PDCCH in the CORESET in CORESET group #1.

According to an embodiment, the terminal may apply the first QCL parameter-related information used to receive the $N^{th}$ PDCCH in the CORESET associated with the monitored search space having the lowest CORESET ID (e.g., CORESET #0 and CORESET #1) in the latest slot in the CORESET group (e.g., CORESET group #0 and CORESET group #1) in which the beam switching occurs, for the reception of the first PDSCH or may apply the second QCL parameter-related information used to receive the N+1th PDCCH for the reception of the second PDSCH. For example, the terminal may apply the pieces of QCL parameter-related information to the first PDSCH and the second PDSCH, respectively, and may performing decoding.

According to another embodiment, the terminal may apply the first QCL parameter-related information used to receive the $N^{th}$ PDCCH in the CORESET associated with the monitored search space having the lowest CORESET ID (e.g., CORESET #0) in the latest slot in the CORESET group (e.g., CORESET group #0 and CORESET group #1) in which the beam switching occurs, for both the reception of the first PDSCH and the reception of the second PDSCH.

According to another embodiment, the terminal may apply the first QCL parameter-related information used to receive the $N^{th}$ PDCCH in the CORESET associated with the monitored search space having the lowest CORESET ID (e.g., CORESET #0) in the latest slot in the lowest CORESET group among the CORESET groups (e.g., CORESET group #0 and CORESET group #1) in which the beam switching occurs, for the reception of the first PDSCH and may drop or may not perform the reception of the second PDSCH. That is, according to the lowest CORESET ID, the reception of the PDSCH may be prioritized.

In another example, both timeDurationForQCLs required to apply the QCL parameters related to the TCI states indicating the beamforming directions for the first PDSCH and the second PDSCH fail to be satisfied, the terminal may operate according to an embodiment described below. Multiple CORESET groups may be configured for the terminal, and in the embodiment, it is assumed that the first PDSCH and the second PDSCH are allocated in association with the PDCCH in CORESET group #0 (e.g., CORESET group #0 includes CORESET #0 to CORESET #4).

According to an embodiment, the terminal may apply, for the reception of the first PDSCH, the QCL parameter used to receive the $N^{th}$ PDCCH in the CORESET associated with the monitored search space based on information on the lowest CORESET ID (e.g., CORESET #0) and/or the second lowest CORESET ID (e.g., CORESET #1) in the latest slot in the CORESET group (e.g., CORESET group #0) in which the beam switching occurs and/or may apply the QCL parameter used to receive the N+1$^{th}$ PDCCH for the reception of the second PDSCH. For example, in FIG. 12, when PDSCH #1 is scheduled from CORESET group #0, the terminal uses the QCL parameter used for PDCCH #N corresponding to the monitored search space for the lowest CORESET ID in the latest slot in a corresponding CORESET group for the reception of PDSCH #1. When PDSCH #2 is scheduled from CORESET group #1, the terminal uses the QCL parameter used for PDCCH #N+1 for the reception of PDSCH #2 as similar to the description above.

According to another embodiment, the terminal may apply, for the reception of the first PDSCH and/or the second PDSCH in which the beam switching occurs, the QCL parameter used to receive the $N^{th}$ PDCCH in the CORESET associated with the monitored search space based on information on the lowest CORESET ID (e.g., CORESET #0) in the latest slot in the CORESET group (e.g., CORESET group #0) in which the beam switching occurs.

According to another embodiment, the terminal may apply, for the reception of the first PDSCH, the QCL parameter used to receive the Nth PDCCH in the CORESET associated with the monitored search space based on information on the lowest CORESET ID (e.g., CORESET #0) in the latest slot in the CORESET group (e.g., CORESET group #0) in which the beam switching occurs and may drop or may not perform the reception of the second PDSCH. That is, according to the lowest CORESET ID, the reception of the PDSCH may be prioritized.

The above-described embodiments describe the case of having the lowest CORESET ID, but may extend the description for the case of having the highest CORESET ID and the like.

Further, in the embodiment described above, the CORESET group (e.g., CORESET group #0 includes CORESET #0 and CORESET #2) exists. However, in some cases, only the CORESET may exist without the concept or configuration of the CORESET group. For the latter cases, solutions may be apparent from an analysis of the above description of the CORESET ID, differing in view of the CORESET group excluded from the above description.

In another example, both timeDurationForQCLs required to apply the QCL parameters related to the TCI states indicating the beamforming directions for the first PDSCH and the second PDSCH fail to be satisfied, the terminal may select at least one the first QCL parameter-related information and the second QCL-parameter-related information used to receive the $N^{th}$ PDCCH in each CORESET associated with the monitored search space having the lowest CORESET ID in the latest slot, apply the selected QCL parameter-related information for both the first PDSCH and the second PDSCH, and perform decoding. For example, the selection scheme may be determined by selecting the lowest/highest CORESET ID among the multiple CORESETs, selecting the PDCCH index allocated in the latest search space, or selecting the longest time gap between the PDSCH transmission and the PUCCH transmission of transmitting ACK/NACK of the PDSCH. According the implementation, multiple PDSCHs may be transmitted from TRP-A or TRP-B.

For example, when tci-PresentinDCI is not configured to be "enabled" by the base station or the terminal receives DCI format 1_0, the terminal may receive NC-JT-based multiple PDSCHs without considering the scheduling timing offset (t_so) and the timeDurationForQCL reported as the UE capability report. That is, when the tci-PresentinDCI is not configured to be "enabled" by the base station or the terminal receives DCI format 1_0, the terminal may assume that only one PDSCH is allocated in one PDCCH and transmitted. For example, the terminal may determine that the beamforming direction of the first PDCCH and the beamforming direction of the first PDSCH indicated by the first PDCCH are identical and the beamforming direction of the second PDCCH and the beamforming direction of the second PDSCH indicated by the second PDCCH are identical.

In another example, when the tci-PresentinDCI is not configured to be "enabled" by the base station, the terminal may determine that the NC-JT-based PDSCH transmission is not supported.

13-00 in FIG. 13A shows the case in which one of t_so1 and t_so2 calculated by the terminal has a value smaller than 14. According to the embodiment, the t_so2 value among multiple t_so values is smaller than 14, the base station and the terminal may perform determination and operation using at least one method among methods illustrated below.

As described in, when the base station does not configure the tci-PresentinDCI to be "enabled" for a particular terminal, the base station may perform scheduling for NC-JT-based transmission without considering scheduling timing offset (t_so) and timeDurationForQCL reported as the UE capability report.

For example, as described above, when the base station configures the tci-PresentinDCI to be "enabled" for a particular terminal, the base station may perform scheduling for NC-JT-based transmission without considering scheduling timing offset (t_so) and timeDurationForQCL reported as the UE capability report.

In another example, when the base station configures the tci-PresentinDCI to be "enabled" for a particular terminal, the base station may perform scheduling for NC-JT-based transmission in consideration of scheduling timing offset (t_so) and timeDurationForQCL reported as the UE capability report. The base station may determine the beam directions of the PDSCHs according to whether to switch the first PDSCH and second PDSCH NC-JT-based transmission beam.

For example, as shown in FIG. 13, the case in which the base station configures, among CORESET group #0 and CORESET group #1 (e.g., CORESET group #0 includes CORSET #0 and #2 and CORESET group #1 includes CORESET #1, #3, and #5), CORESET #0 included in CORESET group #0 and CORESET #1 included in CORESET group #1, for the terminal for NC-JT and the beam switching for the first PDSCH and the second PDSCH among PDSCHs to be transmitted in association with the PDCCHs in the CORESETs occurs is described. The base station may perform at least one of an operation of comparing the timeDurationForQCL and the first scheduling timing offset (t_so1) corresponding to the duration between the first PDCCH and the first PDSCH or an operation of comparing the timeDurationForQCL and the second scheduling timing offset (t_so2) corresponding to the duration between the second PDCCH and the second PDSCH. When the value of one of the first scheduling timing offset and the second scheduling timing offset has a value smaller than that of the timeDurationForQCL, the base station may operate as below. In the embodiment, it is assumed that t_so2 has a value smaller than that of the timeDurationForQCL.

According an embodiment, the base station may apply, for the transmission of the second PDSCH, the QCL parameter used to transmit the $N+1^{th}$ PDCCH in the CORESET associated with the monitored search space having the lowest CORESET ID (e.g., CORESET #1) in the latest slot, based on the CORESET group (e.g., CORESET group #1), in which the offset value is smaller than that of the timeDurationForQCL, among the CORESET groups (e.g., CORESET group #0 and CORESET group #1) and the CORESET ID in the group.

For example, in FIG. 13, when PDSCH #2 is scheduled from CORESET group #1, the QCL parameter used for PDCCH #N+1 corresponding to the monitored search space for the lowest CORESET ID in the latest slot in a corresponding CORESET group is used for the transmission of PDSCH #2.

According to another embodiment, the base station may apply, for the transmission of the second PDSCH, the QCL parameter used to transmit the $N^{th}$ PDCCH in the CORESET associated in the monitored search space having the lowest CORESET ID (e.g., CORESET #0) in the latest slot in the lowest CORESET group (CORESET group #0) among CORESET groups (e.g., CORESET group #0 and CORESET group #1).

According to another embodiment, the base station may apply the QCL parameter for the beamforming direction of the PDSCH (the second PDSCH) scheduled in the CORESET (e.g., CORESET #1) in the CORESET group (e.g., CORESET group #1) in which the offset value is smaller than that of the timeDurationForQCL according to the beamforming direction indicated by the CORESET (e.g., CORESET #0) in the CORESET group (e.g., CORESET group #0) in which the offset value is equal to or larger than the timeDurationForQCL, that is, according to the information of the TCI field indicated by the second PDCCH. When no beam direction is switched in the first PDCCH, the base station may apply the QCL parameter of the first PDCCH (or the first PDSCH) for the second PDSCH.

According to another embodiment, the base station may compare t_so1 and timeDurationForQCL or t_so2 and timeDurationForQCL, regardless of each CORESET group, and when either the t_so1 or the t_so2 has a value smaller than the timeDurationForQCL, the base station may not transmit (may stop or skip transmitting), to a particular terminal, the PDSCH (the second PDSCH) scheduled in the CORESET (e.g., CORESET #1) in which the offset value is smaller than that of the timeDurationForQCL.

In another example, the case in which the base station configures, for a particular terminal, the CORESET (CORESET #0 and CORESET #1) in the CORESET group #0 (e.g., CORESET group #0 includes CORESET #0 and CORESET #1) for NC-JT and the beam switching of at least one of PDSCHs to be transmitted associated with the PDCCH in the CORESETs occurs is described. The base station may perform at least one of an operation of comparing the timeDurationForQCL and the first scheduling timing offset corresponding to the duration between the first PDSCH and the first PDCCH in which the beam switching of the PDSCH occurs or an operation of comparing the timeDurationForQCL and the second scheduling time corresponding to the duration between the second PDSCH and the second PDCCH. When the first scheduling timing offset or the second scheduling timing offset in which the beam switching of the PDSCH occurs has a value smaller than the timeDurationForQCL, the base station may operate as described in various embodiments below.

According to an embodiment, the base station may apply, for the transmission of the second PDSCH, the QCL parameter used to transmit the $N^{th}$ PDCCH in the CORESET associated with the monitored search space having the lowest CORESET ID (e.g., CORESET #0) in the latest slot based on the CORESET ID of the CORESET group (e.g., CORESET group #0) in which the offset value is smaller than that of the timeDurationForQCL.

According to another embodiment, the base station may apply, for the transmission of the second PDSCH, the QCL parameter used to transmit the $N^{th}$ PDCCH in the CORESET associated with the monitored search space having the lowest CORESET ID (e.g., CORESET #0) in the latest slot in the lowest CORESET group (CORESET group #0) in the CORESET group (e.g., CORESET group #0).

According to another embodiment, for NC-JT, the base station may apply the QCL parameter for the beamforming direction of the PDSCH (the second PDSCH) scheduled in the CORESET (e.g., CORESET #1) in which the offset value is smaller than that of the timeDurationForQCL according to the beamforming direction indicated by the CORESET (e.g., CORESET #0) in which the offset value is equal to or larger than the timeDurationForQCL, that is, according to the information of the TCI field indicated by the second PDCCH. When no beam direction is switched in the first PDCCH, the QCL parameter of the first PDCCH (or the first PDSCH) may be applied for the second PDSCH.

According to another embodiment, the base station may compare t_so1 and timeDurationForQCL or t_so2 and time-DurationForQCL for NC-JT, regardless of each CORESET group, and when either t_so1 or t_so2 has a value smaller than the timeDurationForQCL, the base station may not transmit the PDSCH (the second PDSCH) scheduled in the CORESET (e.g., CORESET #1) in which the offset value is smaller than that of the timeDurationForQCL, to a particular terminal.

Further, in the embodiment described above, the CORESET group (e.g., CORESET group #0 includes CORESET #0 and CORESET #2) exists. However, in some cases, only the CORESET may exist without the concept or configuration of the CORESET group. For the latter cases, solutions may be apparent from an analysis of the above description of the CORESET ID, differing in view of the CORESET group excluded from the above description.

The above-described embodiments describe the case of having the lowest CORESET/CORESET group ID, but may extend the description for the case of having the highest CORESET/CORESET group ID and the like.

In the case in which the tci-PresentinDCI is configured to be "enabled" by the base station and the terminal receives DCI format 1_1 of the first PDCCH or the second PDCCH, when the scheduling timing offset (t_so) calculated by the terminal has a value smaller than the UE capacity parameter timeDurationForQCL (e.g., S14) reported to the base station, the terminal may not expect the NC-JT-based transmission of the base station. For example, when t_so1 has a value of 14 or larger and t_so2 has a value smaller than 14, the terminal may determine that the NC-JT-based transmission is not performed in the base station. That is, when the timeDurationForQCL required to apply the QCL parameter related to the TCI state indicating the beamforming direction for the second PDSCH fails to be satisfied, the terminal may skip the reception operation of the second PDSCH indicated by the second PDCCH.

In the case in which the tci-PresentinDCI is configured to be "enabled" by the base station and the terminal receives DCI format 1_1 of the first PDCCH or the second PDCCH, when the scheduling timing offset (t_so) calculated in one CORSET has a value smaller than the UE capacity parameter timeDurationForQCL (e.g., S14) reported to the base station, the terminal may consider the NC-JT-based transmission of the base station as below in accordance with an example embodiment. Multiple CORESET groups may be configured for the terminal, and in the embodiment, it is assumed that the first PDSCH is allocated in association with the PDCCH in the CORESET in CORESET group #0 and the second PDSCH is allocated in association with the PDCCH in the CORESET in CORESET group #1.

According to an embodiment, when t_so1 has a value of 14 or larger in the CORESET in CORESET group #0 and t_so2 has a value smaller than 14 in the CORESET in CORESET group #1, the terminal may determine that the NC-JT-based transmission is performed in the base station. That is, when the timeDurationForQCL required to apply the QCL parameter related to the TCI state indicating the beamforming direction for the second PDSCH fails to be satisfied, the terminal may apply (override), for the reception of the second PDSCH, the QCL parameter used to receive the $N+1^{th}$ PDCCH in the CORESET associated with the monitored search space having the lowest CORESET ID (e.g., CORESET #1) in the latest slot based on the CORESET ID and the CORESET group (e.g., CORESET group #1) in which t_so2 has a value smaller than the timeDurationForQCL.

According to various embodiments, when t_so1 in the CORESET in CORESET group #0 has a value of 14 or larger and t_so2 in the CORESET in CORESET group #1 has a value smaller than 14, the terminal may determine that the NC-JT-based transmission is performed in the base station. That is, the terminal may apply, for the reception of the second PDSCH, the QCL parameter used to receive the $N^{th}$ PDCCH in the CORESET associated with the monitored search space having the lowest CORESET ID (e.g., CORESET #0) in the latest slot in the lowest CORESET group (CORESET group #0) among the CORESET groups (e.g., CORESET group #0 and CORESET group #1).

According to another embodiment, when t_so1 in the CORESET in CORESET group #0 has a value of 14 or larger and t_so2 in the CORESET in the CORESET group #1 has a value smaller than 14, the terminal may determine that the NC-JT-based transmission is performed in the base station. That is, the terminal may apply the QCL parameter for the beamforming direction of the PDSCH (the second PDSCH) scheduled in the CORESET (e.g., CORESET #1) in the CORESET group (e.g., CORESET group #1) in which the offset value is smaller than that of the timeDurationForQCL according to the beamforming direction indicated by the CORESET (e.g., CORESET #0) in the CORESET group (e.g., CORESET group #0) in which the offset value is equal to or larger than the timeDurationForQCL, that is, according to the information of the TCI field indicated by the second PDCCH. When no beam direction is switched in the first PDCCH, the terminal may apply the QCL parameter of the first PDCCH (or the first PDSCH) for the second PDSCH.

According to another embodiment, the base station may compare t_so1 and timeDurationForQCL or t_so2 and timeDurationForQCL, regardless of each CORESET group, and when either the t_so1 or the t_so2 has a value smaller than the timeDurationForQCL, the base station may not transmit, to a particular terminal, the PDSCH (the second PDSCH) scheduled in the CORESET (e.g., CORESET #1) in which the offset value is smaller than that of the timeDurationForQCL.

In another example, in the case in which the tci-PresentinDCI is configured to be "enabled" by the base station and the terminal receives DCI format 1_1 of the first PDCCH or the second PDCCH, when the scheduling timing offset (t_so) calculated in one CORSET has a value smaller than the UE capacity parameter timeDurationForQCL (e.g., S14) reported to the base station, the terminal may consider the NC-JT-based transmission of the base station as below in accordance with an example embodiment. The case in which the CORESET (for example, CORESET #0 and CORESET #1) may be configured for the terminal for NC-JT in CORESET group #0 (e.g., CORESET group #0 includes CORESET #0 to CORESET #4) and the beam switching of at least one of PDSCHs to be transmitted in association with the PDCCH in the CORESETs occurs is described. However, the disclosure is not limited thereto and the number of CORESETs configured for the terminal may change depending on the configuration of the base station.

According to an embodiment, the terminal may apply, for the reception of the second PDSCH, the QCL parameter used to receive the $N^{th}$ PDCCH in the CORESET associated with the monitored search space having the lowest CORESET ID (e.g., CORESET #0) in the latest slot based on the CORESET ID of the CORESET group (e.g., CORESET group #0) in which the offset value is smaller than that of the timeDurationForQCL.

According to another embodiment, the terminal may apply, for the reception of the second PDSCH, the QCL parameter used to receive the $N^{th}$ PDCCH in the CORESET associated with the monitored search space having the lowest CORESET ID (e.g., CORESET #0) in the latest slot in the lowest CORESET group (CORESET group #0) in the CORESET group (e.g., CORESET group #0).

According to another embodiment, for NC-JT, the terminal may apply the QCL parameter for the beamforming direction of the PDSCH (the second PDSCH) scheduled in the CORESET (e.g., CORESET #1) in which the offset value is smaller than that of the timeDurationForQCL according to the beamforming direction indicated by the CORESET (e.g., CORESET #0) in which the offset value is equal to or larger than the timeDurationForQCL, that is, according to the information of the TCI field indicated by the second PDCCH. When no beam direction is switched in the first PDCCH, the QCL parameter of the first PDCCH (or the first PDSCH) may be applied for the second PDSCH.

According to another embodiment, the base station may compare t_so1 and timeDurationForQCL or t_so2 and timeDurationForQCL for NC-JT, regardless of each CORESET group, and when either t_so1 or t_so2 has a value smaller than the timeDurationForQCL, the base station may not transmit the PDSCH (the second PDSCH) scheduled in the CORESET (e.g., CORESET #1) in which the offset value is smaller than that of the timeDurationForQCL, to a particular terminal.

Further, in the embodiment described above, the CORESET group (e.g., CORESET group #0 includes CORESET #0 and CORESET #2) exists. However, in some cases, only the CORESET may exist without the concept or configuration of the CORESET group. For the latter cases, solutions may be apparent from an analysis of the above description of the CORESET ID, differing in view of the CORESET group excluded from the above description.

The above-described embodiments describe the case of having the lowest CORESET/CORESET group ID, but may extend the description for the case of having the highest CORESET/CORESET group ID and the like.

For example, when tci-PresentinDCI is not configured to be "enabled" by the base station or the terminal receives DCI format 1_0, the terminal may receive NC-JT-based multiple PDSCHs without considering the scheduling timing offset (t_so) and the timeDurationForQCL reported as the UE capability report. That is, when DCI format 1_0 is received, the terminal may assume that only one PDSCH allocated by one PDCCH is transmitted by the base station. For example, the terminal may determine that the beamforming direction of the first PDCCH and the beamforming direction of the first PDSCH indicated by the first PDCCH are identical and the beamforming direction of the second PDCCH and the beamforming direction of the second PDSCH indicated by the second PDCCH are identical.

In another example, when the tci-PresentinDCI is not configured to be "enabled" by the base station, the terminal may determine that the NC-JT-based PDSCH transmission is not supported.

13-50 in FIG. 13B shows the case in which both the duration (t_so1) between the last symbol of the first PDCCH and the start symbol of the first PDSCH and the duration (t_so2) between the last symbol of the second PDCCH and the start symbol of the second PDSCH calculated by the terminal has a value of 14 or larger. In this case, the base station and the terminal may perform determination and operation using at least one method among methods illustrated below.

For example, when the above condition is satisfied, the base station may configure the tci-PresentinDCI to be always "enabled" at the time of NC-JT. Alternatively, when the tci-PresentinDCI is configured to be "enabled", the base station may configure the scheduling timing so as to always satisfy the timing condition at the time of NC-JT.

In the case in which the tci-PresentinDCI is configured to be "enabled" by the base station and the terminal receives DCI format 1_1 of the first PDCCH or the second PDCCH, when the scheduling timing offset (t_so) has a value equal to or larger than the UE capability parameter timeDurationForQCL (e.g., S14) reported to the base station, the terminal may apply the QCL assumption indicated by the TCI field in a corresponding PDCCH (TCI) for a corresponding PDSCH DMRS port. For example, the terminal may apply the QCL parameter related to the TCI states for the first PDSCH and the second PDSCH based on the TCI field information of DCI in each of the first PDCCH and the second PDCCH, order to switch the beamforming direction of the PDSCH. When the CORESET group is also configured, the above operation may be easily applied by being inferred according to Embodiments 8-1 to 8-3.

For example, when the base station does not configure the tci-PresentinDCI to be "enabled" or configures DCI format 1_0, for the terminal, the base station may not perform scheduling for the NC-JT. That is, the tci-PresentinDCI is not configured to be "enabled" by the base station and the terminal receives DCI format 1_0, the terminal may assume that the base station transmits only one PDSCH allocated by one PDCCH. For example, the terminal may determine that the beamforming direction of the first PDCCH and the beamforming direction of the first PDSCH indicated by the first PDCCH are identical and the beamforming direction of the second PDCCH and the beamforming direction of the second PDSCH indicated by the second PDCCH are identical.

In the above embodiments, the terminal may expect that one or more default QCLs are configured in NC-JT based on multiple PDCCHs in one CORESET.

Figure 14:
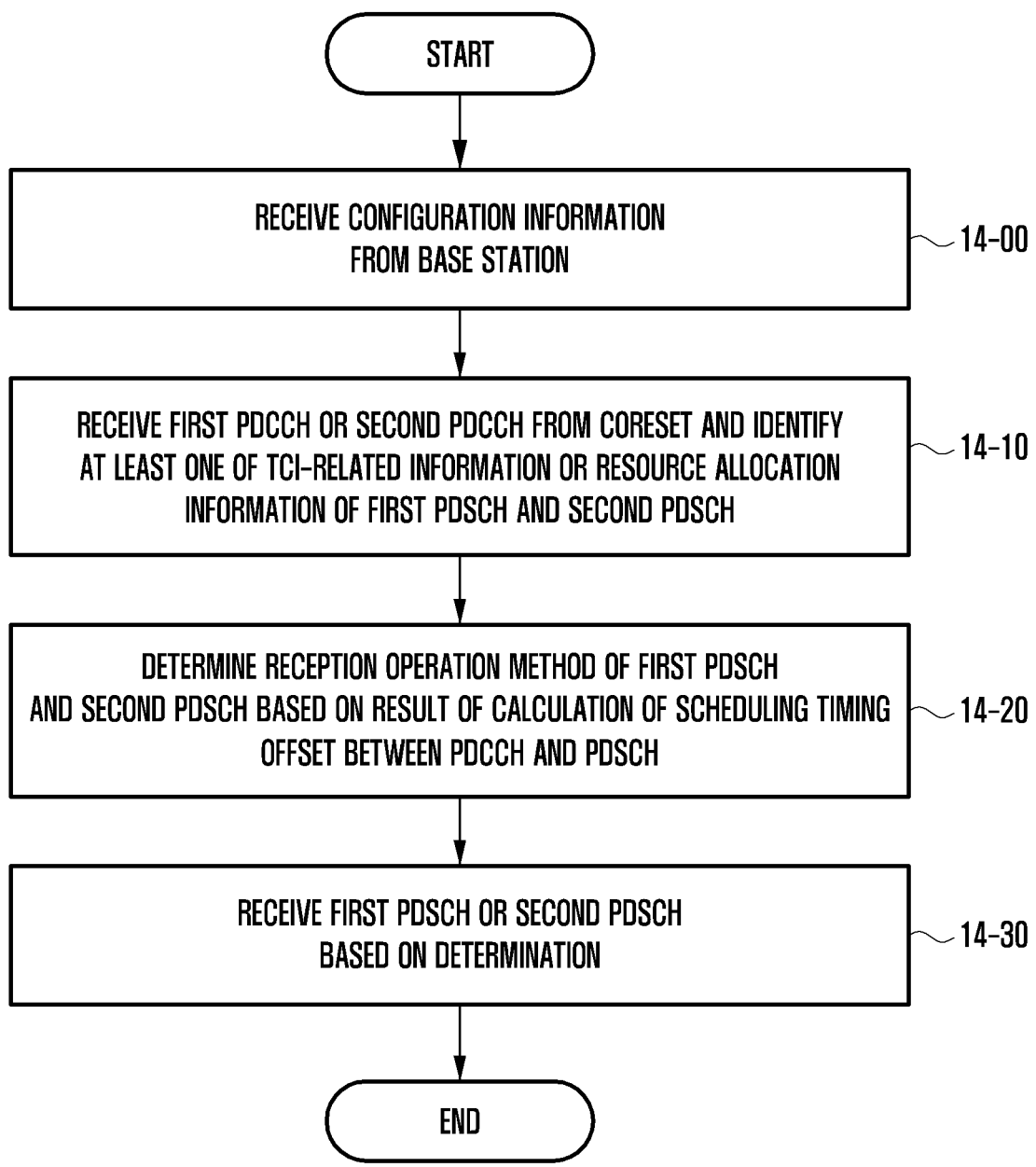
FIG. 14 is a flowchart illustrating an example of cooperative communication based on a single PDCCH and multiple PDCCHs according to an embodiment.

FIG. 14 is a flowchart illustrating an example method for receiving an NC-JT-based PDSCH by a terminal and a default QCL assumption according to an embodiment.

In the process of RRC configuration with the base station, the terminal may receive at least one piece of configuration information including at least one of a base station beamforming-related parameter (tci-PresentinDCI) and parameters or configuration information of a control channel and a data channel (PDDCH-config, PDSCH-config) (14-00).

Further, the terminal may transmit UE capability information (timeDurationForQCL) to the base station (14-00). The terminal may transmit the UE capacity information upon the request from the base station or at a predetermined time point (for example, in the process of RRC configuration with the base station). Accordingly, when the base station has received the UE capability information, the process of receiving the UE capability information may be omitted. Alternatively, according to the configuration information, the UE capability reception operation itself may be omitted.

The terminal receives a first PDCCH or a second PDCCH in a particular CORESET based on the configuration information from the base station.

Further, the terminal may identify at least one piece of resource allocation information, TCI-related information, and antenna port information of a first PDSCH or a second PDSCH (14-10) based on the first PDCCH or the second PDCCH.

Based on the identified information, the terminal may calculate (determine) a scheduling timing offset between the PDCCH and the PDSCH (at least one of a scheduling timing offset between the first PDCCH and the first PDSCH or a scheduling timing offset between the second PDCCH and the second PDSCH) and may determine (14-20) at least one of a reception operation (or a reception operation method) or a reception beamforming direction of the first PDSCH or the second PDSCH based on the result of the calculation. In this case, determining of the reception operation method by the terminal may include the determining of whether to receive data through at least one of the first PDSCH or the second PDSCH or determining of at least one data reception method when the data reception is determined.

Based on at least one of the identified information (14-00) and the result of the determination (14-20), the terminal may receive data through the first PDSCH and the second PDSCH corresponding to the first PDCCH and the second PDCCH, respectively (14-30).

Further, the terminal may perform decoding of the received data.

[Table 17] shows a simply listed Abstract syntax notation (ASN. 1) structure of a serving cell. Hereinafter, an embodiment is described based on higher-level information element and field information shown in [Table 17] in order to distinguish the configuration of a multi-TRP from an NC-JT-based multi-TRP.

In [Table 17], ServingCell may be mapped to a corresponding cell index through ServingCellIndex. ServingCellIndex may refer, for example, to an ID of a serving cell, a value of 0 when a corresponding servicing cell is PCell of a master cell group, a value configured to be servCellIndex of SpCellConfig information element (IE) in the case of PSCell, and sCellIndex of SCellConfig IE in the case of PSCell.

Further, physCellId refers to a physical cell identifier of a serving cell and a corresponding ID may be a value configured for ServingCellConfigCommon IE. The configuration of a transmission resource such as a BWP and the configuration related to a downlink transmission channel of a corresponding serving cell may be defined by IEs such as ARFCN, PDSCH-ServingCellConfig, BWP, PDCCH-Config, and PDSCH-Config. Similarly, the configuration related to the uplink transmission of a corresponding serving cell may be defined by IEs such as ARFCN, PUSCH-ServingCellConfig, BWP, PUCCH-Config, and PUSCH-Config. For NC-JT-based multi-TRP transmission, a pair or set of TRPs may be configured based on the parameter or IE in [Table 17].

For example, for the NC-JT-based multi-TRP transmission, a pair or set of TRPs may be configured or divided in units of ServingCell IEs. In this case, when TRPs are divided with reference to each ServingCell, for the NC-JT-based transmission, a pair or set of different ServiceCells may be configured. When any change is required, ServiceCells may be additionally combined and changed. That is, different ServingCell objects may be mapped for each of TRPs so that multiple base stations are operated. Further, a pair of set of ServiceCells may be configured and a separate higher-layer parameter may be configured therefrom. For NC-JT, multi-TRPs may have the same SSB carrier or SCS-SpecificCarrier. Further, the multi-TRPs may include the same SCS, the same carrier BW, and the same point A (a common reference point for resource block grids or the lowest subcarrier of common RB 0).

In another example, for the NC-JT-based multi-TRP transmission, a pair or set of TRPs may be configured or divided in units of PDCCH-configs. In this case, since multi-TRPs include the same ServingCells, the terminal may determine that the multi-TRPs are the same cell. When the base station configures a pair or set of TRPs in units of PDDCH-configs for the NC-JT, the terminal may determine the configuration and change of the TRP through the configuration and change of PDCCH-config in the process of the RRC configuration or reconfiguration. That is, two or more multi-TRPs may configure multiple CORESETs and SearchSpaces through PDCCH-config and may additionally allocate different scrambling IDs or different time/frequency resources. The maximum five CORESETs may be used for each PDCCH-config for URLLC and the TRPs may configure TCI states that are independent from each other for the PDCCH diversity performance.

In another example, for the NC-JT-based multi-TRP transmission, a pair or set of TRPs may be configured or divided in units of CORESETs or CORESET groups under PDCCH-config. In this case, since multi-TRPs include the same ServingCells, the terminal may determine that the multi-TRPs are the same cell. When the base station configures a pair or set of TRPs in units of CORESETs or CORESET groups for the NC-JT, the terminal may determine the configuration and change of the TRP through the configuration and change of the CORESET (index) or CORESET group (index) under PDCCH-config in the process of the RRC configuration or reconfiguration. That is, for transmission of two or more multi-TRPs, CORESET indices may be associated with each other or the CORESET group index configured for each CORESET may be used so that the CORESETs of the TRPs are mapped to be associated with each other and operated.

The maximum number of CORESETs configured to the same TRP may be determined according to the capability of the terminal and the base station may configure the maximum candidate value of the CORESET to be a minimum of three to a maximum of five (e.g., URLLC scenario) in consideration of the value of the capacity of the terminal. Further, the maximum CORESET group (index) number supported by the terminal may be configured to be equal to or smaller than the maximum number of CORESETs configured for the terminal. The terminal supporting the NC-JT in the rel-16 supports a maximum of two CORESET groups. The terminal may store the configured CORESET group (index) in a memory according to the value of the capacity of the terminal and may manage the same based thereon.

When a higher-layer index is configured for each CORESET, in the case of the multi-DCI-based operation and in the case where multiple dataScramblingIdentityPDSCH parameters are configured, each dataScramblingIdentityPDSCH is associated with the higher-layer index for each CORESET and is applied to the PDSCH which has scheduled the DCI identified in the CORESET having the same higher-layer index.

TABLE 17

```
1> ServingCell
  2> ServingCellIndex
  2> physCellId
  2> downlink
    3> ARFCN
    3> PDSCH-ServingCellConfig
      4> pucch-Cell
    3> BWP
      4> PDCCH-Config
        5> CORESET
          6> pdcch-DMRS-ScramblingID
        5> SearchSpace
      4> PDSCH-Config
        5> dataScramblingIdentityPDSCH
        5> DMRS
          6> scramblingID0
          6> scramblingID1
        5> TCI-States
  2> uplink
    3> ARFCN
    3> BWP
      4> PUCCH-Config
      4> PUSCH-Config
        5> dataScramblingIdentityPUSCH
        5> DMRS
          6> scramblingID0
          6> scramblingID1
      4> SRS-Config
      4> RACH-Config
```

FIG. 15 is a block diagram illustrating an example structure of a terminal in a wireless communication system according to an embodiment.

Referring to FIG. 15, a terminal may include a terminal receiver 15-00, a terminal transmitter 15-10, and a terminal processor (e.g., including processing circuitry) 15-05.

The terminal receiver 15-00 and the terminal transmitter 15-10 may be referred to as a "transceiver". According to the above-described terminal communication method, the terminal receiver 15-00, the terminal transmitter 15-10, and the terminal processor 15-05 of the terminal may be operated. However, an element of the terminal is not limited to the above-described example. For example, the terminal may include more elements (for example, a memory, etc.) or may include less elements. In addition, the terminal receiver 15-00, the terminal transmitter 15-10, and the terminal processor 15-05 may be implemented in the form of a single chip.

The terminal receiver 15-00, the terminal transmitter 15-10 (or the transceiver) may transmit or receive a signal to or from a base station. The signal may include control information and data. To this end, the transceiver may include an RF transmitter for up-converting the frequency of a signal to be transmitted and amplifying the signal, and an RF receiver for low-noise amplifying a received signal and down-converting the frequency of the received signal. However, it is merely an embodiment of the transceiver, and an element of the transceiver is not limited to the RF transmitter and the RF receiver.

Further, the transceiver may receive a signal through a wireless channel, output the received signal to the terminal processor 15-05, and transmit the signal output from the terminal processor 15-05 through the wireless channel.

A memory (not shown) may store data or a program required for operating a terminal. Further, the memory may store data or control information included in a signal obtained by the terminal. The memory may be configured as a storage medium or a combination of storage media including a ROM, a RAM, a hard disk, a CD-ROM, a DVD, and the like.

The terminal processor 15-05 may include various processing circuitry and control a series of processes so that the terminal operates according to the above-described embodiment. The terminal processor 15-05 may be implemented as a controller or one or more processors.

Figure 16:
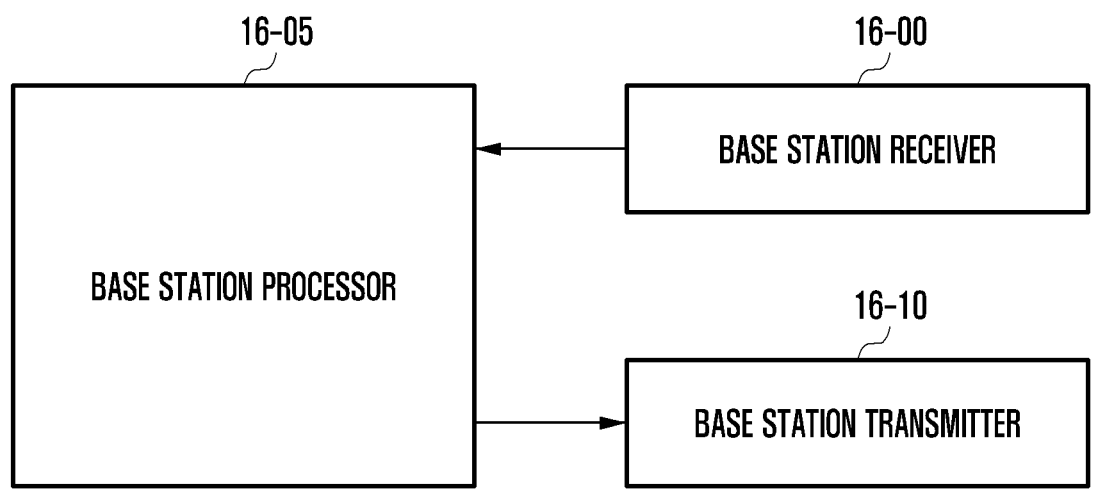
FIG. 16 is a block diagram illustrating an example structure of a base station in a wireless communication system according to an embodiment.

FIG. 16 is a block diagram illustrating an example structure of a base station in a wireless communication system according to an embodiment.

Referring to FIG. 16, a base station may include a base station receiver 16-00, a base station transmitter 16-10, and a base station processor (e.g., including processing circuitry) 16-05.

The base station receiver 16-00 and the base station transmitter 16-10 may be referred to as a "transceiver". According to the above-described terminal communication method, the base station receiver 16-00, the base station transmitter 16-10, and the base station processor 16-05 of the base station may be operated. However, an element of the base station is not limited to the above-described example. For example, the base station may include more elements (for example, a memory, etc.) or may include less elements. In addition, the base station receiver 16-00, the base station transmitter 16-10, and the base station processor 16-05 may be implemented in the form of a single chip.

The base station receiver 16-00 and the base station transmitter 16-10 (or the transceiver) may transmit or receive a signal to or from a terminal. The signal may include control information and data. To this end, the transceiver may include an RF transmitter for up-converting the frequency of a signal to be transmitted and amplifying the signal, and an RF receiver for low-noise amplifying a received signal and down-converting the frequency of the received signal. However, it is merely an embodiment of the transceiver, and an element of the transceiver is not limited to the RF transmitter and the RF receiver.

Further, the transceiver may receive a signal through a wireless channel, output the received signal to the base station processor 16-05, and transmit the signal output from the base station processor 16-05 through the wireless channel.

A memory (not shown) may store data or a program required for operating a terminal. Further, the memory may store data or control information included in a signal obtained by the base station. The memory may be configured as a storage medium or a combination of storage media including a ROM, a RAM, a hard disk, a CD-ROM, a DVD, and the like.

The base station processor 16-05 may include various processing circuitry and control a series of processes so that the terminal operates according to the above-described embodiment. The base station processor 16-05 may be implemented as a controller or one or more processors.

In the drawings in which methods of the disclosure are described, the order of the description does not always correspond to the order in which steps of each method are performed, and the order relationship between the steps may be changed or the steps may be performed in parallel.

In the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Further, although not disclosed herein, methods using separate tables or information including at least one element included in the tables illustrated in the disclosure may be possible.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A method of operating a terminal, comprising:
   receiving configuration information from a base station;
   receiving first control information corresponding to a first control channel and second control information corresponding to a second control channel from the base station based on the configuration information;
   determining a first time offset between a first data channel and the first control channel based on the first control information and a second time offset between a second data channel and the second control channel based on the second control information;
   determining a data reception operation method through the first data channel or the second data channel based on the first time offset and the second time offset, wherein determining the data reception operation method includes selecting between receiving data through the first data channel, through the second data channel, or through the first and second data channels based on the first time offset, the second time offset and time duration information for quasi-co-location (QCL) of the terminal; and
   receiving data through at least one of the first data channel and the second data channel based on a result of the determining.

2. The method of claim 1, wherein the first control information comprises at least one of resource allocation information, transmission configuration indication (TCI) information, and antenna port information of the first data channel, and
   wherein the second control information comprises at least one of resource allocation information, TCI information, and antenna port information of the second data channel.

3. The method of claim 1, wherein the configuration information comprises at least one of a beamforming-related parameter, control channel configuration information, and data channel configuration information.

4. The method of claim 3, wherein the determining further comprises:
   identifying a reception beamforming direction based on the beamforming-related parameter.

5. The method of claim 1, further comprising:
   transmitting user equipment (UE) capability information comprising the time duration information for quasi-co-location (QCL).

6. The method of claim 5, wherein the determining further comprises:
   comparing first time duration information for QCL with the first time offset or second time duration information for QCL with the second time offset; and
   determining a data reception operation method through the first data channel or the second data channel based on a result of the comparing.

7. A terminal comprising:
   a transceiver; and
   a controller configured to control the terminal to:
   receive configuration information from a base station;
   receive first control information corresponding to a first control channel and second control information corresponding to a second control channel from the base station based on the configuration information;
   determine a first time offset between a first data channel and the first control channel based on the first control information and a second time offset between a second data channel and the second control channel based on the second control information;
   determine a data reception operation method through the first data channel or the second data channel based on the first time offset and the second time offset, wherein determining the data reception operation method includes selecting between receiving data through the first data channel, through the second data channel, or through the first and second data channels based on the first time offset, the second time offset and time duration information for quasi-co-location (QCL) of the terminal; and
   receive data through at least one of the first data channel and the second data channel based on a result of the determining.

8. The terminal of claim 7, wherein the first control information comprises at least one of resource allocation information, transmission configuration indication (TCI) information, and antenna port information of the first data channel, and
   wherein the second control information comprises at least one of resource allocation information, TCI information, and antenna port information of the second data channel.

9. The terminal of claim 7, wherein the configuration information comprises at least one of a beamforming-related parameter, control channel configuration information, and data channel configuration information.

10. The terminal of claim 9, wherein the controller is configured to:
    identify a reception beamforming direction based on the beamforming-related parameter.

11. The terminal of claim 7, wherein the controller is configured to control the terminal to:
transmit user equipment (UE) capability information comprising the time duration information for quasi-co-location (QCL).

12. The terminal of claim 11, wherein the controller is configured to:
compare first time duration information for QCL with the first time offset or second time duration information for QCL with the second time offset; and
identify whether data is received through the first data channel or the second data channel, based on a result of the comparison.

13. The terminal of claim 7, wherein the first control information comprises resource allocation information, transmission configuration indication (TCI) information and antenna port information of the first data channel, and
wherein the second control information comprises resource allocation information, TCI information and antenna port information of the second data channel.

14. The terminal of claim 7, wherein the configuration information comprises a beamforming-related parameter, control channel configuration information, and data channel configuration information.

15. The terminal of claim 7, wherein the first control channel is a first physical downlink control channel (PDCCH) in a control resource set of a plurality of control resource sets of the base station, the second control channel is a second PDCCH in the control resource set, the first data channel is a first physical downlink shared channel (PDSCH), and the second data channel is a second PDSCH.

* * * * *